United States Patent
Trufinescu et al.

(10) Patent No.: US 7,529,823 B2
(45) Date of Patent: May 5, 2009

(54) NOTIFICATIONS FOR SHARED RESOURCES

(75) Inventors: Adina M. Trufinescu, Redmond, WA (US); Khaled S. Sedky, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 10/402,104

(22) Filed: Mar. 27, 2003

(65) Prior Publication Data

US 2004/0193678 A1 Sep. 30, 2004

(51) Int. Cl.
*G06F 15/173* (2006.01)

(52) U.S. Cl. .................. 709/223; 709/224; 709/225; 455/410; 455/423; 714/48

(58) Field of Classification Search .................. 709/223, 709/224, 225; 455/410, 423; 714/48
See application file for complete search history.

(56) References Cited

U.S. PATENT DOCUMENTS

| | | | |
|---|---|---|---|
| 4,698,688 A | 10/1987 | Ochi et al. |
| 4,829,468 A | 5/1989 | Nonaka et al. |
| 5,014,221 A | 5/1991 | Mogul |
| 5,081,579 A | 1/1992 | Komai |
| 5,131,078 A | 7/1992 | Ikenoue |
| 5,150,454 A | 9/1992 | Wood et al. |
| 5,220,674 A | 6/1993 | Morgan et al. |
| 5,222,200 A | 6/1993 | Callister et al. |
| 5,228,118 A | 7/1993 | Sasaki |
| 5,268,993 A | 12/1993 | Ikenoue et al. |
| 5,276,799 A | 1/1994 | Rivshin |
| 5,287,194 A | 2/1994 | Lobiondo |
| 5,287,434 A | 2/1994 | Bain et al. |
| 5,299,296 A | 3/1994 | Padalino et al. |
| 5,303,336 A | 4/1994 | Kageyama |
| 5,327,526 A | 7/1994 | Nomura et al. |

(Continued)

FOREIGN PATENT DOCUMENTS

EP 0096407 12/1983

(Continued)

OTHER PUBLICATIONS

Alberto L. Moran, Jesus Favela, Ana M. Martinez, and Dominique Decouchant, *Document Presence Notification Services for Collaborative Writing*, © 2001 IEEE, pp. 125-133.

(Continued)

*Primary Examiner*—Saleh Najjar
*Assistant Examiner*—Thuong (Tina) T Nguyen
(74) *Attorney, Agent, or Firm*—Merchant & Gould, P.C.

(57) ABSTRACT

Notifications from shared resources can be directed to appropriate clients. Listener registrations for clients can be matched to sender registrations for shared resources to forward notifications from the shared resources to the appropriate clients. In a terminal server or fast-user switch environment, listener registrations can specify that the listener is interested in notifications associated with the session. Notifications for processing associated with local or remote sessions can be routed to the session initiating the processing. The request for processing notifications can be initiated from the same or different machine. Notifications for a user name or security context can be indicated as desired. Bi-directional communication can be supported. The notification can be used to generate a user interface presentation.

44 Claims, 26 Drawing Sheets

U.S. PATENT DOCUMENTS

| | | | |
|---|---|---|---|
| 5,333,246 | A | 7/1994 | Nagasaka |
| 5,353,388 | A | 10/1994 | Motoyama |
| 5,371,837 | A | 12/1994 | Kimber et al. |
| 5,386,503 | A | 1/1995 | Staggs et al. |
| 5,388,200 | A | 2/1995 | McDonald et al. |
| 5,388,201 | A | 2/1995 | Hourvitz et al. |
| 5,388,207 | A | 2/1995 | Chia et al. |
| 5,483,653 | A | 1/1996 | Furman |
| 5,559,933 | A | 9/1996 | Boswell |
| 5,580,177 | A | 12/1996 | Gase et al. |
| 5,602,974 | A | 2/1997 | Shaw et al. |
| 5,604,847 | A | 2/1997 | Dennis et al. |
| 5,625,757 | A | 4/1997 | Kageyama et al. |
| 5,655,152 | A | 8/1997 | Ohnishi et al. |
| 5,692,111 | A | 11/1997 | Marbry et al. |
| 5,699,495 | A | 12/1997 | Snipp |
| 5,799,206 | A | 8/1998 | Kitagawa et al. |
| 5,845,058 | A | 12/1998 | Shaw et al. |
| 5,905,906 | A * | 5/1999 | Goffinet et al. ............... 710/8 |
| 5,919,247 | A | 7/1999 | Van Hoff et al. |
| 5,931,909 | A | 8/1999 | Taylor |
| 5,960,167 | A | 9/1999 | Roberts et al. |
| 5,974,454 | A | 10/1999 | Apfel et al. |
| 5,995,723 | A | 11/1999 | Sperry et al. |
| 6,031,623 | A | 2/2000 | Smith et al. |
| 6,125,372 | A | 9/2000 | White |
| 6,289,385 | B1 | 9/2001 | Whipple et al. |
| 6,301,012 | B1 | 10/2001 | White et al. |
| 6,424,424 | B1 | 7/2002 | Lomas et al. |
| 6,433,882 | B1 | 8/2002 | Mori et al. |
| 6,654,137 | B1 | 11/2003 | Yagita |
| 6,667,812 | B1 | 12/2003 | Sato et al. |
| 6,694,354 | B1 | 2/2004 | Elg |
| 6,711,557 | B1 * | 3/2004 | Palaniappan ............... 706/45 |
| 6,788,429 | B1 * | 9/2004 | Clough et al. ............. 358/1.15 |
| 6,814,510 | B1 | 11/2004 | Sabbagh et al. |
| 6,931,447 | B1 * | 8/2005 | Hemstreet et al. .......... 709/227 |
| 7,064,856 | B2 | 6/2006 | Fu et al. |
| 7,089,259 | B1 * | 8/2006 | Kouznetsov et al. ........ 707/102 |
| 2002/0038333 | A1 | 3/2002 | Evans et al. |
| 2002/0063880 | A1 * | 5/2002 | Raney ..................... 358/1.14 |
| 2002/0099456 | A1 * | 7/2002 | McLean .................... 700/83 |
| 2003/0014521 | A1 * | 1/2003 | Elson et al. ................ 709/225 |
| 2003/0025935 | A1 | 2/2003 | Somei |
| 2004/0070779 | A1 | 4/2004 | Ferlitsch |
| 2004/0080767 | A1 | 4/2004 | Meilstrup et al. |
| 2004/0143651 | A1 * | 7/2004 | Allen et al. ................ 709/221 |
| 2004/0193678 | A1 | 9/2004 | Trufinescu et al. |
| 2005/0019077 | A1 | 1/2005 | Hatta et al. |
| 2005/0052677 | A1 | 3/2005 | Maruyama |
| 2005/0141006 | A1 | 6/2005 | Aiyama |
| 2005/0179936 | A1 | 8/2005 | Sedky et al. |
| 2005/0210129 | A1 | 9/2005 | Feng et al. |
| 2006/0001908 | A1 | 1/2006 | Ohta |
| 2006/0114508 | A1 | 6/2006 | Keeney et al. |

FOREIGN PATENT DOCUMENTS

| | | | |
|---|---|---|---|
| EP | 0 943 987 A1 | | 9/1999 |
| EP | 094.987 | | 9/1999 |
| WO | WO00/54138 | * | 3/1999 |
| WO | WO 00/54138 | * | 3/1999 |
| WO | WO 00/54138 | * | 9/2000 |
| WO | WO00/54138 | * | 9/2000 |

OTHER PUBLICATIONS

U.S. Appl. No. 09/957,363, filed Feb. 23, 1999, Hinson et al.

U.S. Appl. No. 09/957,364, filed Feb. 23, 1999, Hinson et al.

Dudley, "Publish and Subscribe Module," http://docs.xaraya.com/docs/rfcs/rfc0024.html, pp. 1-4, visited Feb. 24, 2003.

"OpenFusion Java Message Service—White Paper," PrismTech Distributed Software Infrastructure, COBRA, http://prismtechnologies.com/English/Products/COBRA/Integration/, pp. 1-3, visited Feb. 24, 2003.

Mühl, "Generic Constraints for Content-Based Publish/Subscribe," http://informatick.tu-darmstadt.de/GK/participants/muehl/coopsis2001.pdf, pp. 210-215, visited Feb. 24, 2003.

Pietzuch, "Event-Based Middleware: A New Paradigm for Wide-Area Distributed Systems", http://cl.cam.ac.uk/Research/SRG/opera/publications/Papers/prp_event_mw_talk_cabernet.ppt, pp. 1-10, visited Feb. 24, 2003.

"Introduction to URL Security Zones," MSDN Library, http://msdn.microsoft.com/workshop/security/szone/overview, pp. 1-10, visited Feb. 6, 2003.

"Registering for Device Notification," MSDN Library, http://msdn.microsoft.com/library/, pp. 1-2, visited Feb. 19, 2003.

"RegisterDeviceNotification," MSDN Library, http://msdn.microsoft.com/library/, pp. 1-2, visited Feb. 19, 2003.

Brown, "Security Briefs," Managed Security Context in ASP.NET, http://msdn.microsoft.com/msdnmag/issues/02/01/Security/default.aspx, pp. 1-8, visited Feb. 19, 2003.

"Security context configuration," http://www.nsa.gov/selinux/doc/slinux/node21.html, pp. 1-2, visited Feb. 19, 2003.

"Network Contexts," http://www.nsa.gov/selinux/doc/policy/node31.html, p. 1, visited Feb. 19, 2003.

"Defining a Security Context," Administering the ColdFusion Server—Chapter 10: Configuring Advanced Security, http://www.cfcertification.com/cfdocs/Administering_ColdFusion_Server/, p. 1, visited Feb. 19, 2003.

"Platform SDK: Security," MSDN Library, http://msdn.microsoft.com/library/, pp. 1-6, visited Feb. 19, 2003.

"Microsoft Windows 2000 Server Operating System—Windows 2002 Terminal Services: An Integrated, Server-Based Computing Solution," White Paper, Microsoft Corporation, pp.1-7, 1999.

"Cyclades TS Series Console Servers," http://www.trebon.com/cycladests.htm, pp. 1-2, visited Mar. 25, 2003.

"Microsoft RDP & Citrix ICA Feature Overview," Windows 2000 Server, http://www.microsoft.com/windows2000/server/evaluation/features/rdp.asp, pp. 1-3, visited Dec. 20, 2002.

"Processing a Request to Remove a Device," Platform SDK: Device I/O, MSDN Library, http://msdn.microsoft.com/library/, pp. 1-2, visited Feb. 19, 2003.

"Session-to-Session Activation with a Session Moniker," MSDN Library, http://msdn.microsoft.com/library/, pp. 1-2, visited Feb. 19, 2003.

"The Client's Security Context," Platform SDK: Security, MSDN Library, http://msdn.microsoft.com/library/, p. 1, visited Feb. 19, 2003.

"WTSVirtualChannelOpen," Platform SDK: Terminal Services, MSDN Library, http://msdn.microsoft.com/library/, pp. 1-2, visited Feb. 19, 2003.

"Terminal Services Administration," Platform SDK: Terminal Services, MSDN Library, http://msdn.microsoft.com/library/, p. 1, visited Feb. 19, 2003.

"WM_MTSession-Change," Platform SDK: Terminal Services, MSDN Library, http://msdn.microsoft.com/library/, pp. 1-2, visited Feb. 19, 2003.

"Terminal Services API Structures," Platform SDK: Terminal Services, MSDN Library, http://msdn.microsoft.com/library/, p. 1, visited Feb. 19, 2003.

"WTS_Client_DISPLAY," Platform SDK: Terminal Services, MSDN Library, http://msdn.microsoft.com/library/, pp. 1-2, visited Feb. 19, 2003.

"WTS_Process Info," Platform SDK: Terminal Services, MSDN Library, http://msdn.microsoft.com/library/, pp. 1-2, visited Feb. 19, 2003.

"Terminal Services," Platform SDK: Terminal Services, MSDN Library, http://msdn.microsoft.com/library/, p. 1, visited Feb. 19, 2003.

"Terminal Services Administration," Platform SDK: Terminal Services, MSDN Library, http://msdn.microsoft.com/library/, p. 1, visited Feb. 19, 2003.

"WSTVirtualChannelOpen," Platform SDK: Terminal Services, MSDN Library, http://msdn.microsoft.com/library/, pp. 1-2, visited Feb. 19, 2003.
"WTSEEnumerateSessions," Platform SDK: Terminal Services, MSDN Library, http://msdn.microsoft.com/library/, pp. 1-2, visited Feb. 19, 2003.
"WM_WTSESSION_Change," Platform SDK: Terminal Services, MSDN Library, http://msdn.microsoft.com/library/, pp. 1-2, visited Feb. 19, 2003.
"Terminal Services," Platform SDK: Terminal Services, MSDN Library, http://msdn.microsoft.com/library/, p. 1, visited Jan. 30, 2003.
"About Terminal Services," Platform SDK: Terminal Services, MSDN Library, http://msdn.microsoft.com/library/, p. 1, visited Jan. 30, 2003.
"Resources on a Terminal Server," Platform SDK: Terminal Services, MSDN Library, http://msdn.microsoft.com/library/, pp. 1-2, visited Jan. 30, 2003.
"Peripheral Hardware," Platform SDK: Terminal Services, MSDN Library, http://msdn.microsoft.com/library/, p. 1, visited Jan. 30, 2003.
"Using a Session Moniker," Platform SDK: Terminal Services, MSDN Library, http://msdn.microsoft.com/library/, pp. 1-2, visited Jan. 30, 2003.
"Remote Control Persistent Virtual Channels," Platform SDK: Terminal Services, MSDN Library, http://msdn.microsoft.com/library/, p. 1, visited Jan. 30, 2003.
"Session-to-Session Activation with a Session Moniker," Platform SDK: Terminal Services, MSDN Library, http://msdn.microsoft.com/library/, pp. 1-2, visited Jan. 30, 2003.
"WTSQueryUserConfig," Platform SDK: Terminal Services, MSDN Library, http://msdn.microsoft.com/library/en-us/termserv/wtsqueryuserconfig.asp_fram, pp. 1-2, visited Jan. 30, 2003.
"WTS_ConnectState_Class," http://msdn.microsoft.com/library/, pp. 1-2, visited Jan. 30, 2003.
"Remote Desktop Web Connection," Platform SDK: Terminal Services, MSDN Library, http://msdn.microsoft.com/library/, pp. 1-2, visited Jan. 30, 2003.
"Terminal Services User Configuration," Platform SDK: Terminal Services, MSDN Library, http://msdn.microsoft.com/library/, p. 1, visited Jan. 30, 2003.
Anderson, "Terminal Services and Terminal Servers," Windows & .Net Magazine, http://www.winnetmag.com/Articles/Index_cfm_ArticleID-7511, pp. 1-2, visited Jan. 30, 2003.
"Technical Overview of Terminal Services," Windows.Net Server 2003, http:216.239.53.100/search_q=cache:Tng7mm9MaTYC:www.gstgral.de/pdf/, p. 1-10, visited Jan. 30, 2003.
"Microsoft Windows 2000 Server Operating System—Windows 2002 Terminal Printer Redirection," White Paper, Microsoft Corporation, pp. 1-36, 2002.
"Windows 2000 Terminal Services Printer Redirection," Windows 2000 Home, http://www.microsoft.com/windows2000/, p. 1, visited Jan. 30, 2003.
"Work with All of Your Data and Applications While Away from Your Office," Windows XP Home, http://www.microsoft.com/WINDOWSXP/pro/evaluaton/overviews/remoteaccess.asp, pp. 1-3, visited Jan. 30, 2003.
"Remote Desktop in Windows XP," Windows XP Home, http://www.microsoft.com/windowsxp/remotedesktop/, pp. 1-2, visited Jan. 30, 2003.
"Deployment Planning Guide," Windows 2000 Home, http://microsoft.com/windows2000/techinfo/reskit/dpg/default.asp, pp. 1-7, visited Jan. 27, 2003.
"Chapter 16—Deploying Terminal Services," Part 4, Windows 2000 Upgrade and Installation, Microsoft Corporation, pp. 577-622, visited Jan. 2003.
"Microsoft Windows 2000 Server, Terminal Services and Printing," Microsoft Corporation, pp. 1-5, Apr. 2002.
"FindFirstPrinterChangeNotification," MSDN Home, Windows GDI, http://msdn.microsoft.com/library/, pp. 1-3, visited Jan. 23, 2003.
"FirstFindPrinterChangeNotification," MSDN Home, Display and Print Devices: Windows DDK, http://msdn.microsoft.com/library/, pp. 1-2, visited Jan. 23, 2003.
"FindClosePrinterChangeNotification," MSDN Home, Windows GDI, http://msdn.microsoft.com/library/, pp. 1-2, visited Jan. 23, 2003.
"ReplyPrinterChangeNotification," MSDN Home, Display and Print Devices: Windows DDK, http://msdn.microsoft.com/library/, pp. 1-2, visited Jan. 23, 2003.
"FindNextPrinterChangeNotification," MSDN Home, Windows GDI, http://msdn.microsoft.com/library/, pp. 1-3, visited Jan. 23, 2003.
"Printer_Notify_Info_Data," MSDN Home, Windows GDI, http://msdn.microsoft.com/library/, pp. 1-4, visited Jan. 23,2003.
"About Printing," MDSN Home, Windows GDI, http://msdn.microsoft.com/library/, p. 1, visited Jan. 27, 2003.
"Bidi Communication Support," MSDN Home, Windows GDI, http://msdn.microsoft.com/library/, p. 1, visited Jan. 27, 2003.
"Bidi Communications Schema," MSDN Home, Windows GDI, http://msdn. microsoft.com/library/, pp. 1-5, visited Jan. 27, 2003.
"Printer Output," MSDN Home, Windows GDI, http://msdn.microsoft.com/library/, p. 1, visited Jan. 27, 2003.
"Retrieving a Printer Device Context," MSDN Home, Windows GDI, http://msdn. microsoft.com/library/, p. 1, visited Jan. 27, 2003.
"Sending Data Directly to a Printer, MSDN Home, Windows, GDI, " http://msdn.microsoft.com/library/, pp. 1-2, visited Jan. 27, 2003.
"Using the Bidi Schema to Query a Device, MSDN Home, Windows GDI," http://msdn.microsoft.com/library/, p. 1, visited Jan. 27, 2003.
"Printing and Print Spooler Functions," MSDN Home, Windows GDI, http://msdn. microsoft.com/library/, pp. 1-3, visited Jan. 27, 2003.
Biron, P.V.; Malhotra, A. "XML Schema Part 2: Datatypes Second Edition", Oct. 2004, http://www.w3.org/TR/xmlschema-2.
Bradner, S., "Key words for use in RFCs to Indicate Requirement Levels", BCP 14, RFC 2119, Mar. 1997, http://www.ietf.org/rfc/rfc2119.txt.
Custer H., "Networking," Inside Windows NT, 1993, pp. 285-328, Microsoft Press, Redmond, WA.
Gujar, Uday G. "A Device Independent Computer Plotting System," The papers of the ACM Symposium on Graphic languages, 1976, pp. 85-100.
Hayton et al. "Using Events to Build Large Scale Distributed Applications," Systems support for worldwide applications, 1996, pp. 9-16.
Hoffman, P.; Yergeau, F. "UTF-16, an encoding of ISO 10646", RFC 2781, Feb. 2000, http://www.ietf.org/rfc/rfc2781.txt.
Howarth, R.J.; Platte, B.G. "The continuing evolution of advanced Function Printing," IBM Systems Journal; vol. 32, No. 2; 1993; pp. 665-683.
Isaacson, Scott. "A Model for Internet Printing," Dec. 1998; vol. 6, No. 4; pp. 147-156.
Kugler, Carl; Lewis, Harry. "Internet Printing Protocol (IPP) Encoding and Transport," Dec. 1998, vol. 6, Issue: 4; pp. 157-163.
Mandler, John. "A printing solution for a multimedia environment," Hewlett-Packard Journal, Apr. 1994, pp. 44-52.
McClelland, Deke. "Macintosh.RTM. System 7.1: Everything You Need To Know," 2d. ed., Sybex.RTM., San Francisco, California 1993, pp. 106-110,379,384-387.
Michalek, Peter; Sweet, Michael. "Implementing an IPP Client and Server for Linux," Dec. 1998; vol. 6, Issue: 4; pp. 164-171.
Microsoft Corporation, "Metafiles", http://go.microsoft.com/?linkid=5072922.
Microsoft Corporation, "XML Paper Specification", http://go.microsoft.com/?linkid=5060289.
Microsoft.RTM Windows NT.TM. System Guide, Microsoft Corporation, Mar. 1993, Chapter 6, "Print Manager," pp. 173-201.
Morris et al., "Interface Issues in Computer Support for Asynchronous Communication," © 1999 ACM.
The Open Group, "DCE 1.1: Remote Procedure Call", C706, Aug. 1997, http://www.opengroup.org/public/pubs/catalog/c706.htm.
Wright, F.D. "Requirements and Design Goals for an Internet Printing Protocol," StandardView, Dec. 1998, vol. 6, No. 4, pp. 172-179.

Common UNIX Printing System (CUPS) Documentation [online]. [Retrieved on Sep. 18, 2007]. Retrieved from: http://www.cups.org/documentation.php/overview.html.

Document Management—Electronic Document File Format for Long-Term Preservation. International Standard, ISO 19005-1, First Edition, Oct. 1, 2007, pp. 1-36.

IEEE Standard for Information Technology—Transport Independent Printer/System Interface (TIP/SI). Microprocessor and Microcomputer Standards Committee of the IEEE Computer Society. IEEE Std. 1284.1, Jul. 29, 1997.

Isaacson, S. et al. Internet Printing Protocol/1.1: Event Notification Specification. IETF Draft, Aug. 25, 1999. pp. 1-55.

Rozen, Matt and Fetty, Cynthia. Adobe to Release PDF for Industry Standardization. Adobe Press Release, Jan. 29, 2007, pp. 1-2.

Srinivasan, R. RPC: Remote Procedure Call Protocol Specification Version 2, RFC 1831, Aug. 1995, pp. 1-17.

Sweet, Michael. A Bright New Future for Printing on Linux. Linux Today, Jun. 9, 1999, pp. 1-10.

Bieszczad, Andrzej; Mobile Agents for Network Management, Sep. 1998.

Kortuem, Ger, Fickas Steve, Seggal Zary, On-Demand Delivery of Software in Mobile Environments (Scientific Paper) (Apr. 1997).

Raza, Syed Kamran, Network Configuration with Plug and Play Components, Apr. 1998.

Examination Report in European Patent Application No. EP-04 004 993.4-2413, Jul. 14, 2005, 7 pages.

Response to Examination Report (Jul. 14, 2005) in European Patent Application No. EP-04 004 993.4-2413, Nov. 23, 2005, 37 pages.

Examination Report in European Patent Application No. EP-04 004 993.4-2413, May 15, 2006, 8 pages.

Response to Examination Report May 15, 2006) in European Patent Application No. EP-04 004 993.4-2413, Oct. 6, 2006, 17 pages.

Hayes, "Microsoft's Terminal Server Arrives on the Scene,"*ENT News*, Sep. 1998, 4 pages.

* cited by examiner

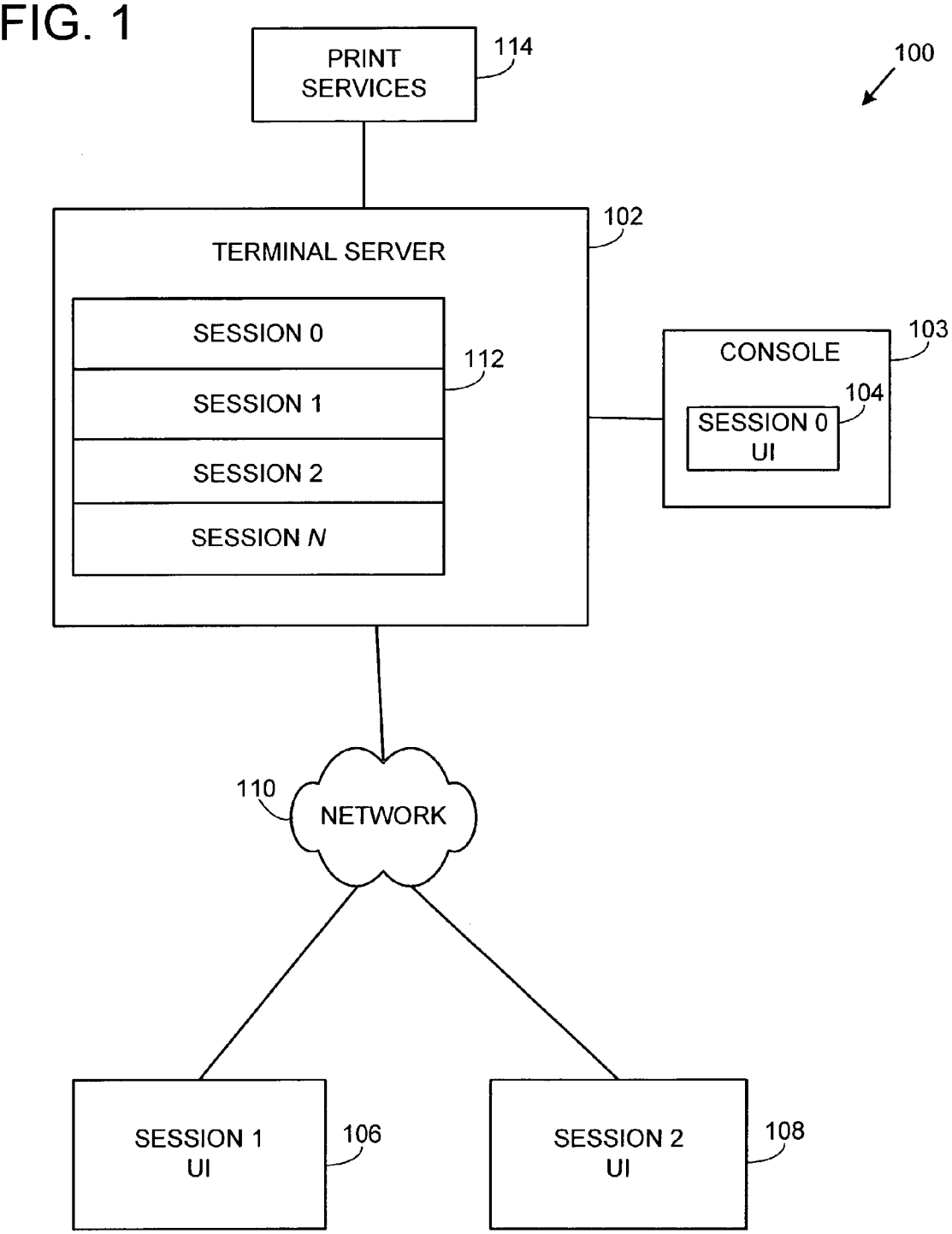

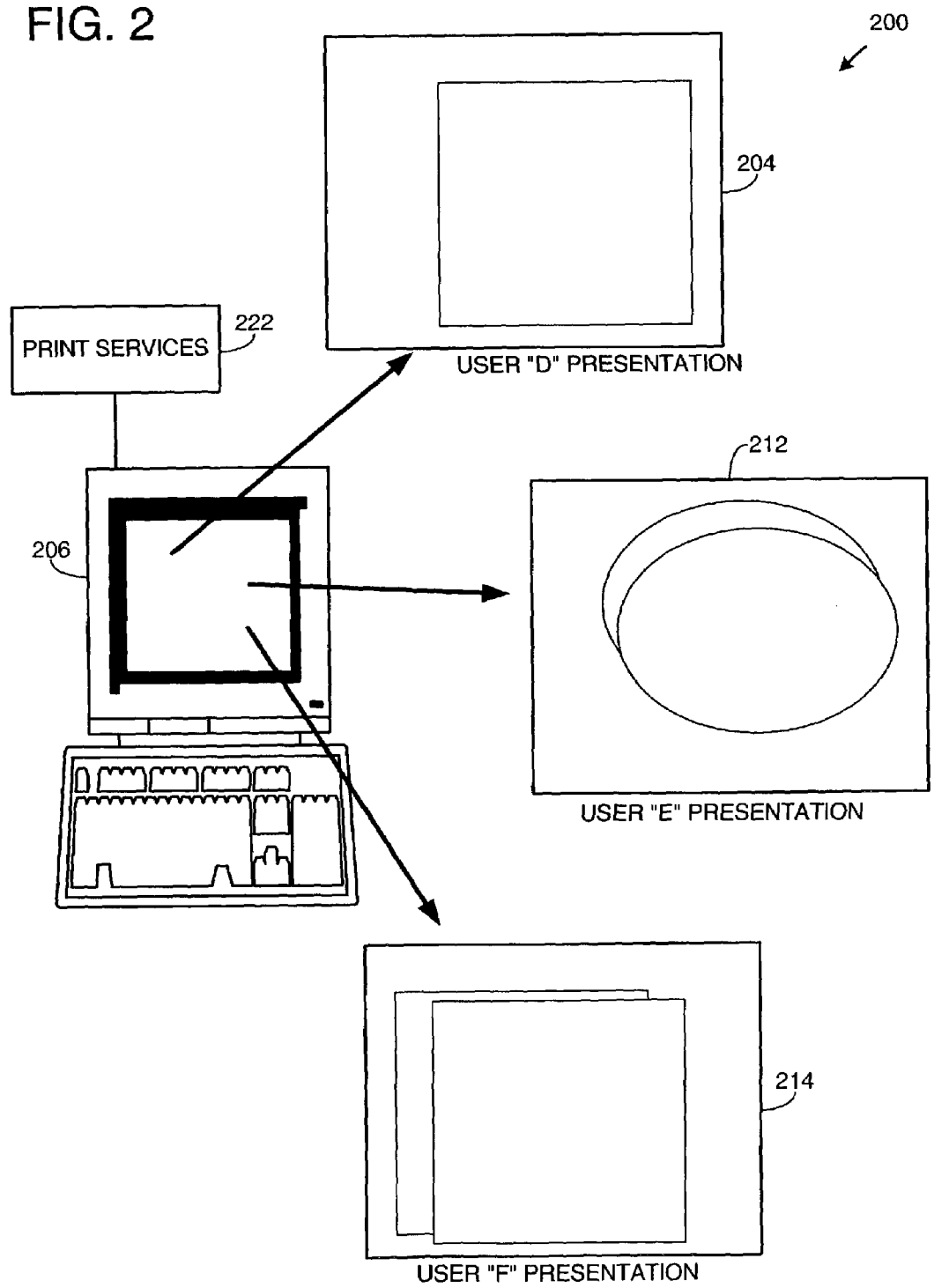

NOTIFICATIONS FOR SHARED RESOURCES

TECHNICAL FIELD

The technical field relates to notifications for shared resources, such as those shared over a computer network.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Organizations have become increasingly dependent on shared computing resources in order to maintain high levels of cost effective productivity. Although many resources may be shared, a familiar example of a shared resource is a printer, which is typically shared via a print queue. Those wishing to print to the printer invoke software that adds a print job to the queue. The print job is eventually processed by appropriate software (e.g., a print monitor and print driver) to generate appropriate output, such as a printed document.

Terminal Server Environment

FIG. 1 shows an exemplary conventional system 100 for sharing a resource, such as print services 114. The example includes terminal server software 102 supporting user interfaces 104, 106, and 108 for multiple users. The user interface 104 is a special case in that it is associated with the physical console 103 (e.g., monitor and keyboard) of the computer executing the terminal server software 102. In practice, processing associated with the console user interface 104 can be associated with privileged access rights because access to the console 103 typically involves physical access to the computer system on which the terminal server software 102 is executing. The user interfaces 106 and 108 may be presented remotely from the console 103 via a network 110; therefore, it may not be desirable to grant such user interfaces the privileged access rights.

Any of the user interfaces shown may be used to interact with a shared resource such as mail services, print services, or file services. When performing operations on such shared resources, it is conventional practice to execute the shared service in the special session associated with the local console 103 (e.g., session 0) because these services access privileged resources to complete their tasks. When a message is generated for the shared resource, it is directed to the user interface associated with the appropriate task. So, for shared services, such messages are sent to the console (e.g., session user interface 104).

For example, a user can interact with a user interface 106 at a remote console in communication with the terminal server 102 over a network 110 to request print services. Because the print driver is hosted by print services (e.g., a spooler) running under the local console (i.e., in session "0"), if a printer 114 responds to the print request with a message indicating that the printer is out of paper, the message will be presented at the graphical user interface 104 associated with the console 103. Thus, the user who requested the print services at the remote user interface 106 will not be aware of the printer message.

Fast User Switch

FIG. 2 shows another exemplary conventional system 200 for sharing resources, such as print services 222. In the example, the computer 206 offers a "fast-user-switch" feature. If a user interface presentation 204 for user "D" is currently shown on the computer 206, user "E" can switch the user interface presentation 204 to a presentation 212 for user "E" (e.g., via an appropriate command) without logging out user "D." In practice, a password may be requested before switching presentations. Similarly, if user "F" wishes to use the computer 206, then user "F" can activate the command, and the user interface presentation for user "F" 214 is presented on the computer 206 without logging out user "E."

In this example, if user "D" 204 requests services from a shared resource (e.g., a print queue), and an out-of-paper message is received from the printer, the message is displayed on the user presentation of whichever user controls the display when the out-of-paper message is received by the computer 206, rather than the user who requested the printing.

In these examples, the user requesting a resource may be unaware that there was a resource request failure, because the user interface message is not presented to the user responsible for the request.

SUMMARY OF THE INVENTION

The described technologies can provide notifications from a shared resource for a client. For example, one or more notifications can be sent to one or more clients interacting with one or more shared resources.

In some examples, plural clients utilize one or more shared resources. A client using the shared resource can be registered as a listener with a notification server. When the shared resource sends a notification, the notification is forwarded to clients when the notification server determines that one or more properties associated with the notification match with one or more properties associated with the registered client.

Properties can be associated with the notification via a sender registration. Properties can include a session identifier, a user identifier, a notification type, and others. A filter method at the notification server can be used to determine matches.

In some examples, a terminal server is processing plural sessions. A registration can be created for a session to receive notifications associated with the session. If the shared resource is executing in the console session, notifications can still be sent back to the session responsible for invocation of the shared resource. The notification can be used to generate a user interface presentation for the session. For example, the user interface presentation can indicate a condition of the shared resource.

When a shared resource executing in the console session sends a notification to the notification server, the notification server compares registered properties for the shared resource, which can include an indication of the session responsible for invocation of the shared resource. Upon determining that appropriate properties registered for the shared resource match properties registered for the session, the notification is forwarded accordingly. The notification can be used to generate a user interface presentation (e.g., to generate a user interface for the session that requested the shared resource).

In terminal server or other scenarios involving plural sessions, generating the user interface presentation for the notification that requested the shared resource can protect privacy and enhance security. The notification may include private or security information that is not to be viewed or accessed by another user. Further, the notification may include associated functionality (e.g., to cancel processing). Instead of sending the notification to the console session, which may accessible to another user, the notification is sent for processing by the session that requested the resource. In this way, presentation information about the resource request and control over the resource remains in the hands of the party that requested the resource.

The notification service can support replies to the notification. Bi-directional communication can thus be supported.

Properties associated with a registration can be obtained from a source other than the registering client or shared resource. For example, properties can be obtained from information about the registration call of the client or from the security context. In the case of a session identifier, the session identifier associated with a calling client can be stored for later retrieval (e.g., when registering a shared resource used by the client).

A notification service can operate without regard to the data contained in the notifications. For example, a notification type can indicate how the notification is to be processed. The notification service can process and forward notifications of any notification type.

Additional features and advantages will be made apparent from the following detailed description of the illustrated embodiments, which proceeds with reference to the accompanying drawings.

BRIEF DESCRIPTION OF THE DRAWINGS

FIG. 1 is an example of a terminal server system.

FIG. 2 is an example of a "fast-user-switch" scenario.

DETAILED DESCRIPTION

EXAMPLE 1

Exemplary System Overview

Figure 3A:
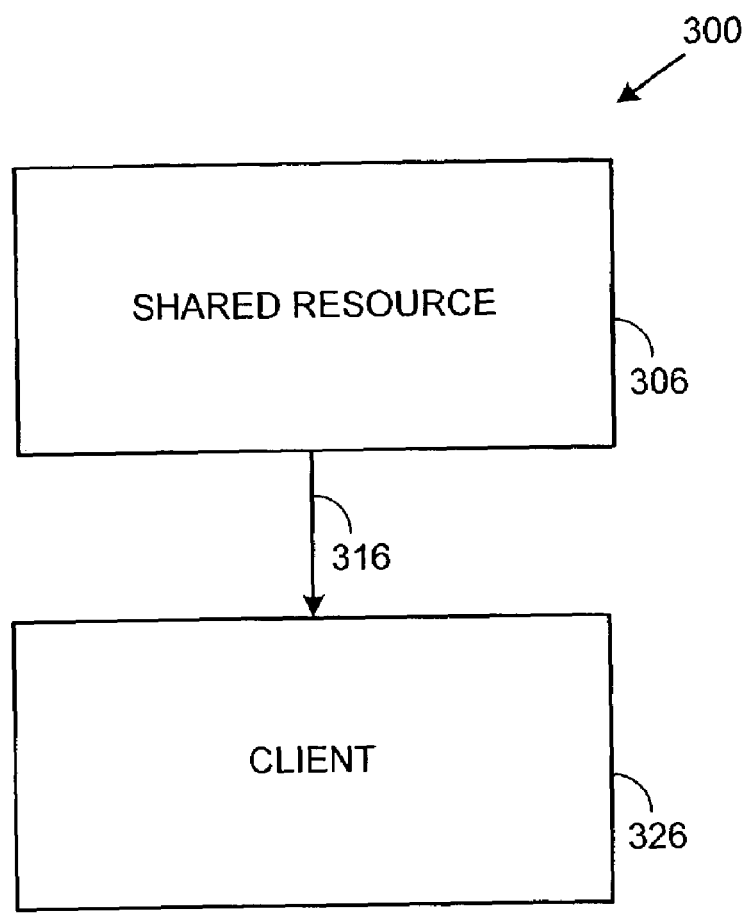
FIG. 3A is an exemplary system for notifications for a shared resource.

FIG. 3A shows an exemplary system 300 by which a notification 316 for a shared resource 306 is directed to an appropriate client 326. For example, a notification 316 can be forwarded to the client 326 based on a comparison of properties associated with the notification 316 and properties associated with the client 326. Although only one shared resource 306, one notification 316, and one client 326 are shown, in practice a system may involve plural resources 306, plural notifications 316, plural clients 326, or some combination thereof.

EXAMPLE 2

Another Exemplary System Overview

Figure 3B:
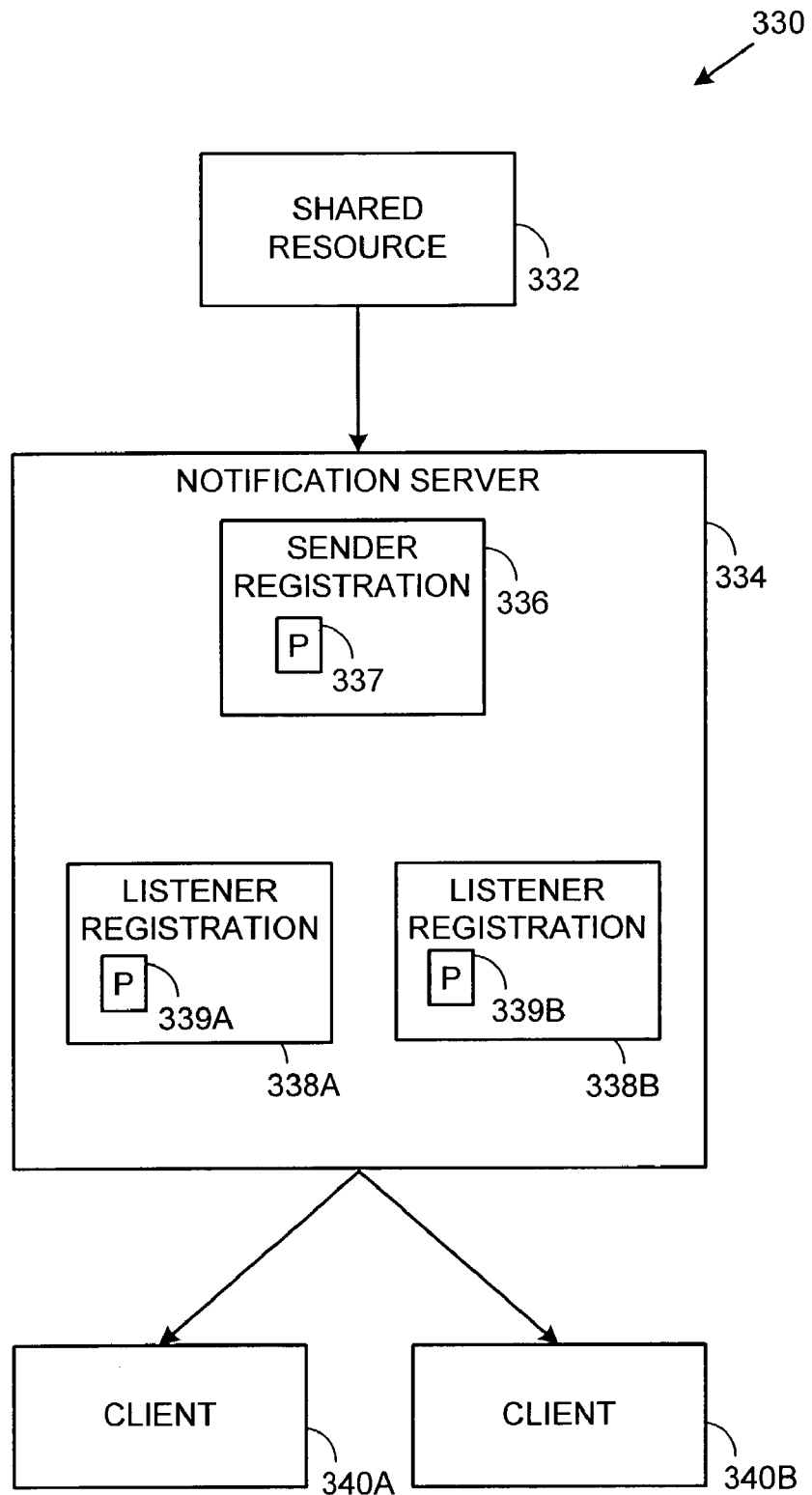
FIG. 3B is an exemplary system for achieving registrations for notifications from shared resources.

FIG. 3B shows an exemplary system 330 by which one or more notifications are sent from one or more shared resources 332 to a notification server 334, which sends at least an indication of the notification (e.g., forwards the notification) to one or more clients 340A, 340B. Other intermediaries may be involved in notification forwarding, and the shared resource or clients may be hosted by (e.g., run in the same process as) the notification server.

In the example, the notification server 334 includes a sender registration 336 associated with and consulted when registrations are received from the shared resource 332. Similarly, the listener registration 338A is associated with the client 340A and is consulted to determine whether received notifications should be matched with and forwarded to the client 340A. Likewise, the listener registration 338A is associated with the client 340B.

The registrations 336, 338A, 338B comprise the properties 337, 339A, 339B, respectively. The sender properties 337 can be compared to the listener properties 339A, 339B to determine whether there is a match to control notification routing. A match can be defined in a variety of ways, such as whether a subset of the properties are identical. Some properties can be defined as matching any value.

EXAMPLE 3

Another Exemplary System Overview

Figure 3C:
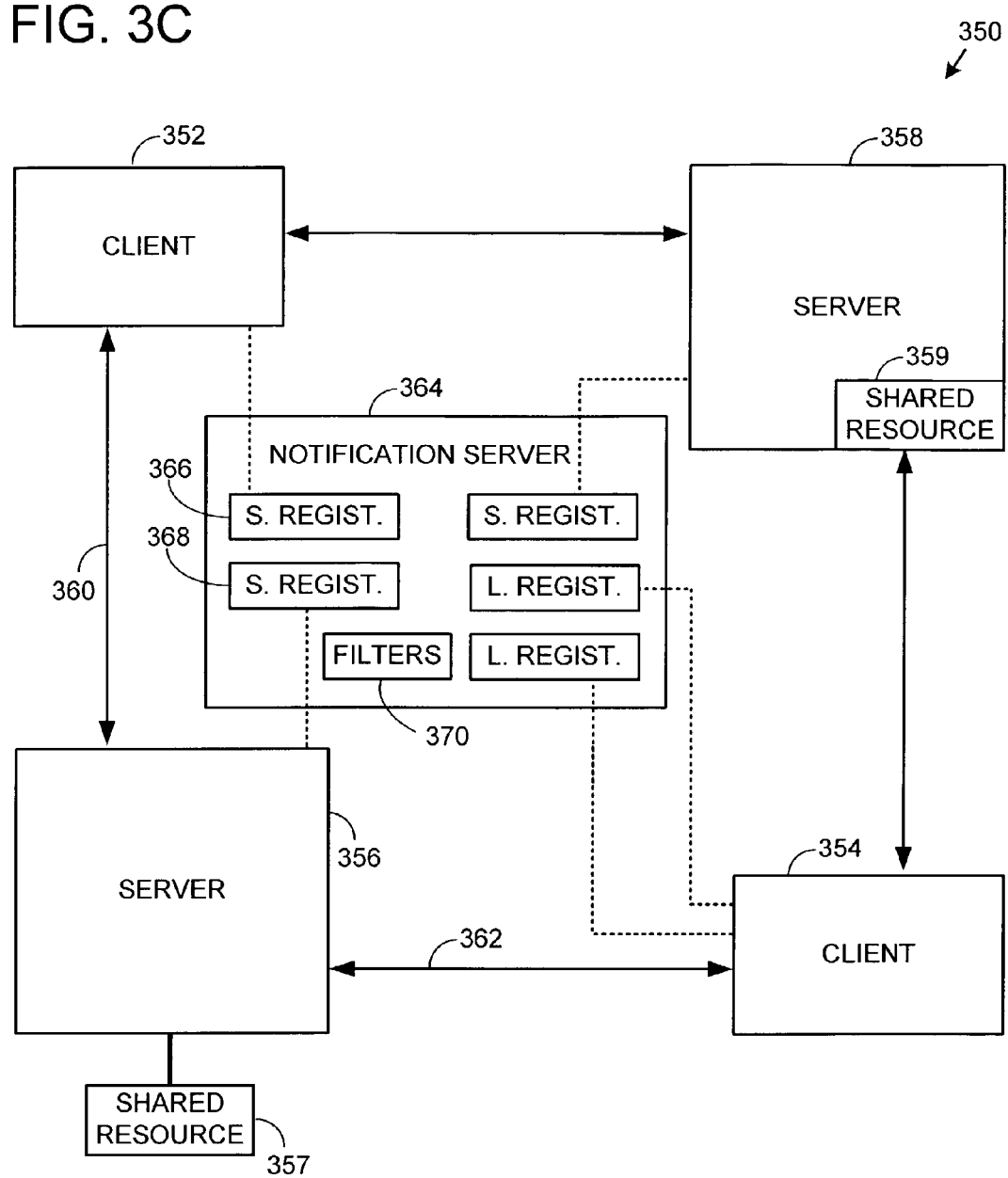
FIG. 3C is another exemplary system for achieving registrations for notifications from shared resources.

FIG. 3C shows yet another exemplary system 350 by which notifications are sent to clients. In the exemplary system 350, one or more clients 352, 354 utilize one or more servers 356, 358 to access one or more shared resources 357, 359 (e.g., via requests 360, 362). Additionally, a client 352 can register as a listener to create the listener registration 366 with a notification server 364, and a server 356 can register as a sender to create the sender registration 368 with the notification server 364.

In the example, when a notification is generated by shared resource server 356 having a sender registration 368, a filter method 370 at the notification server 364 determines whether there is a client registered to receive an indication of the notification. For example, a client 352 has an associated listener registration 366 for a shared resource at a specific sever 356 and receives an indication of the notification, if the filter 370 determines that the client is registered for notifications that match a property of the listener registration 366.

In the example, the entities shown in FIG. 3C (e.g., the clients 352, 354, the servers 356, 358, and the notification server(s) 364) are not process address space dependent. For example, the entities could be objects executing in a same process space, threads operating in a same process space, or separate processes each operating in a different process space on a different machine somewhere on a network. The scenario can also include permutations and combinations of shared and separate processes or address spaces. In any of the examples, a shared resource, a client, or a server can be a program, a process, a thread, a component (e.g., under an object model), composite programs, composite components (e.g., dynamically linked or packaged), or the like.

EXAMPLE 4

Exemplary Shared Resources

In any of the examples, one or more servers can provide access to one or more shared resources by one or more clients. Exemplary shared resources include file services, mail services, print services, or any other shared application, program, or service.

Although physical devices such as printers are sometimes called shared resources, a suitable software counterpart often exists (e.g., a print queue).

In any of the examples, shared resources may run local to or externally to the associated server. For example, a server may host execution of the shared resources.

EXAMPLE 5

Exemplary Shared Resources in Printing Scenarios

In an exemplary printer scenario applied to any of the examples, a print spooler can serve as a notification server running in a terminal server environment in the console session (i.e., "0"), and the shared resource can be a printer driver hosted by the notification server.

In such a scenario, the print spooler/notification server provides a way for spooler-hosted components such as print drivers, print processors, or print monitors to send notifications to (and receive replies from) applications running in different sessions and security contexts. Thus, print components executing in a spooler process can send user interface notifications to the session or context from which the print job was initiated. This scenario can be employed for sending notifications to any registered client/component whether that client/component exists inside or outside the spooler address space.

In another scenario, a print processor manual duplex component can be a shared resource and uses the notification system to send a notification to a client component to display the user interface that tells the user to flip the pages. In yet another scenario, a driver auto-configuration component can be a shared resource and uses the notification system to update driver rich status. In another scenario, a fax component can be a shared resource and uses the notification system to send notifications that a fax was received.

EXAMPLE 6

Exemplary Listener and Sender Properties

Listener and sender properties can take a variety of forms. In one implementation, at least one identity context property is associated with a notification.

The identity context property associated with a notification (e.g., via a registration) can then be compared to those for potential listeners (e.g., those associated with registrations for listeners) to find matches, if any.

An identity context property can comprise a user identifier, a security context identifier (e.g., a security id or "SID"), a session identifier (e.g., a terminal server session identification or a fast user switch session identification), or some combination thereof.

The terminal session identifier can comprise one or more identifiers sufficient to identify a session among other sessions. In some cases, such an identifier may distinguish between plural sessions at plural terminal servers.

Other exemplary listener and sender properties that can be used in place of or in addition to an identity context property include a notification type (e.g., a Globally Unique IDentifier, a message format identifier, a type version number, a type expiration date, and the like), a communication type or protocol type (e.g., bidirectional channel, unidirectional channel, asynchronous message, etc.), a process identifier, a shared resource identifier, a machine identifier, network location information, another identifying or network topological identifier, other message routing or identification information, or some combination thereof.

By specifying appropriate properties, a listener can specify which notifications it would like to receive. In some cases, properties can be specified by the sender/listener, but in other cases (e.g., when specifying user identity or session), the properties can be collected for the sender/listener, verified, or both.

EXAMPLE 7

Exemplary Overview of Method for Processing Notifications

Figure 4A:
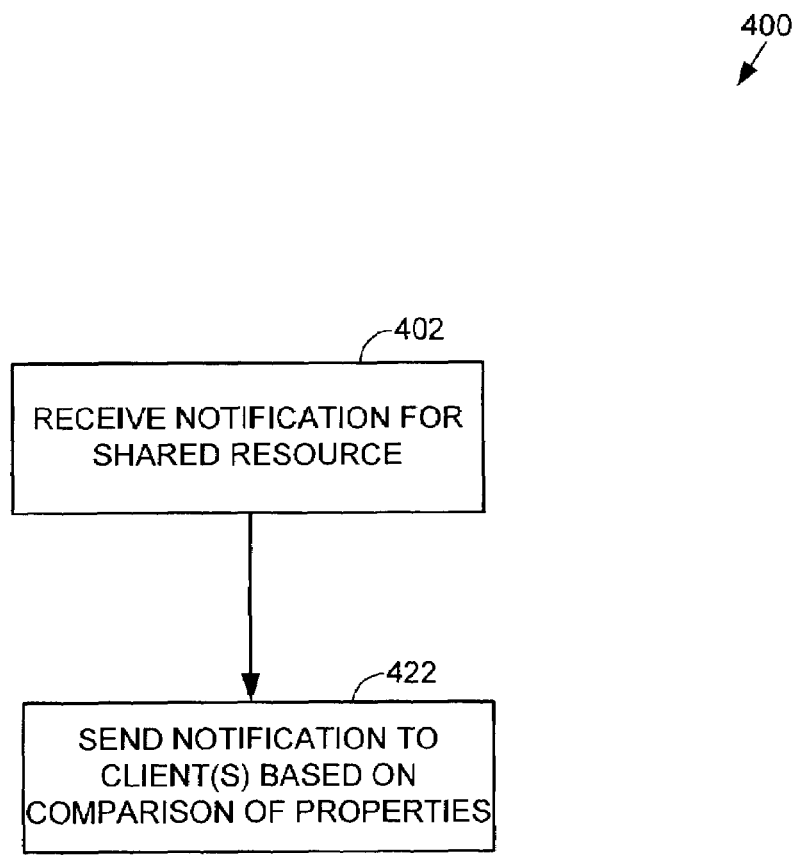
FIG. 4A is a flow chart of method for processing notifications.

FIG. 4A shows an exemplary method 400 for accomplishing sending notifications. The method and any of the other methods shown herein can be implemented in software via computer-executable instructions.

At 402, a notification is received for a shared resource. At 422, based on and responsive to the notification, at least an indication of the notification is sent (e.g., the notification is forwarded) to appropriate clients based on comparison of properties (e.g., of the sender and the listener). Such properties can be determined, for example, during registration of the sender (e.g., a shared resource or server) and the listener (e.g., a client of the server or shared resource).

The sent notification of 422 can comprise or be of the same form as the received notification of 402 (e.g., the notification is forwarded), or of a different form. The actions shown in FIG. 4A can be performed by a notification server or some other software.

EXAMPLE 8

Exemplary Method Involving Registration

Figure 4B:
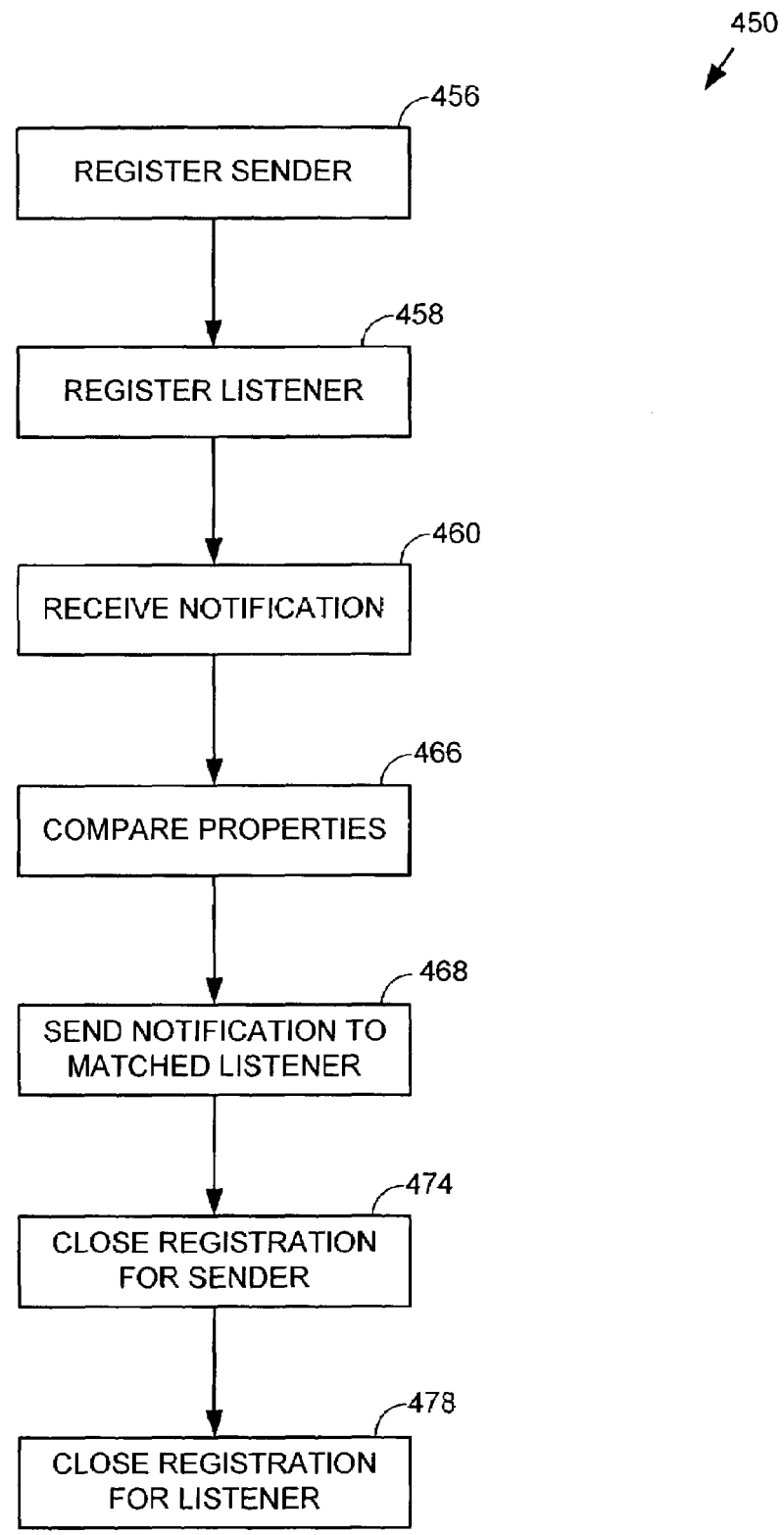
FIG. 4B is a flow chart of a method for registering senders and listeners and processing notifications.

FIG. 4B shows an exemplary method 450 for accomplishing sending notifications via registration. At 456, a sender (e.g., a server or other shared resource) is registered (e.g., with a notification server) for sending notifications as a result of a registration request. In practice, such a registration request is sent by the entity wishing to send notifications (e.g., a server or other shared resource), but registration can be performed on behalf of the sender (e.g., by a server for a shared resource).

Sender registration can include obtaining sender properties, which can be provided in the registration request itself (e.g., via parameters) or determined in some other way (e.g., by determining information about the source of the request). The sender properties can indicate any of the exemplary sender properties described herein.

Sender registration can include associating the sender properties with the sender. In one example, a sender registration component is created, and the association is contained in a component (e.g., as a data structure) that holds the properties and a sender identifier (e.g., a shared resource identifier) associated with the sender (e.g., via an identifier).

At 458, a listener (e.g., a client) is registered (e.g., with a notification server) for receiving registrations as a result of a registration request. In practice, such a registration request is sent by the listener, but registration can be performed on behalf of the listener.

Listener registration can include obtaining listener properties, which can be provided in the registration request itself (e.g., via parameters) or determined in some other way (e.g., by determining information about the source of the request). The listener properties can indicate any of the exemplary listener properties described herein.

Listener registration can include associating the listener properties with the listener. In one example, a listener registration component is created, and the properties are stored in the component (e.g., as a data structure) and associated with the listener (e.g., via an identifier).

At 460, a notification is received for (e.g., from) the shared resource. In any of the examples, the notification can include indication of an object sent by the shared resource. The object can represent the notification and include data for the notification.

Responsive to receiving the notification, the method compares the sender properties (e.g., registered by the shared resource sending the notification) with registered listener properties at 466. At 468, at least an indication of the notification is sent (e.g., the notification is forwarded) to the one or more listeners (e.g., clients) having registered listener properties matching the registered sender properties, if any.

Some clients (e.g., components run by an administrator) having privileged rights can register for special (e.g., privileged) types of notifications, or for notifications sent to other users. In such a case, a match between properties can be defined so that appropriate sender properties (e.g., a user identity) match properties for any value for the same property (e.g., any user) or specified values (e.g., specified users).

Clients having privileged rights can also be allowed to create a registration to cause other components to receive certain notifications (e.g., notifications for other sessions), even if the client component itself has not registered properties for such notifications.

If desired, registrations can then be closed, or additional notifications can be sent. At 474, registration for the sender is closed. At 478, registration for the listener is closed.

Although not explicitly shown in the drawing, in some scenarios, the method may be in a wait state when between receiving the various requests. The order of the actions (e.g., 456/458 and 474/478) can be rearranged or reversed if desired. Asynchronous operation can thus be supported.

EXAMPLE 9

Exemplary Methods Involving Registration in Printing Scenarios

The method shown in FIG. 4B can be used in various printing scenarios. In one scenario, a client component registers for notifications created by a print driver component while running in the client component's security context. In another scenario, a client component registers for notifications created by a print monitor component running in a certain terminal session (e.g., the same terminal session of the client). In another scenario, a client component registers for spooler notifications of a certain notification type.

In this way, a client can be provided with notifications as desired. The client can run on the same machine as the print server or on a different machine. The client machine can be a terminal server where users connect remotely to a terminal server session.

EXAMPLE 10

Exemplary Client Registration and Notification Method

Figure 5:
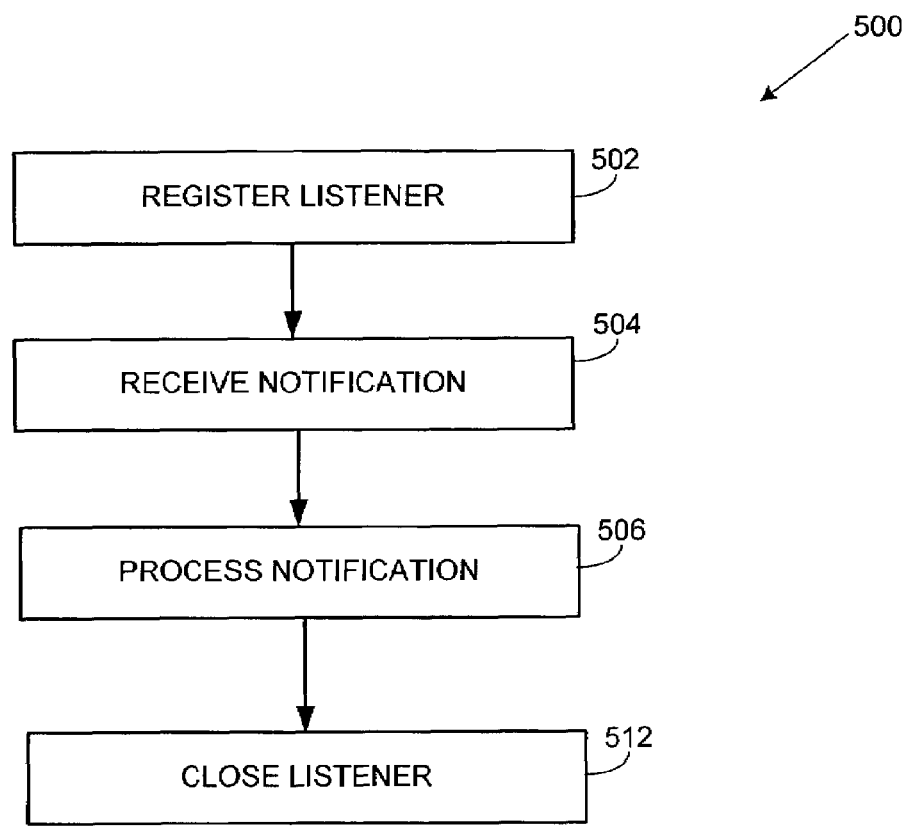
FIG. 5 is a flow chart of a method for a client to register and receive notifications from a shared resource.

FIG. 5 shows an exemplary method 500 implemented by a client program registering listener properties for receiving notifications from a notification server. In one scenario, the client is associated with a session running in a terminal server. In another scenario, the client is associated with one of plural users (e.g., user states) between which users can switch in a computer environment without logging on or off. A client is typically one of plural clients requesting services from a shared resource and registering for notifications via a notification server.

At 502, a client registers one or more listener properties with a notification server. The listener properties can be obtained from the client via parameters or otherwise obtained (e.g., by determining in which session the client is running). As described above, components running on behalf of an administrator may have additional capabilities. The client can then continue with other processing tasks, until such time as a notification matching the registered properties is received from the notification server.

At 504, the client receives a notification. Such a notification can originate by being forwarded to the client based on a match between the properties registered for the client and properties associated with the notification (e.g., registered for the sender of the notification).

At 506, upon receiving the notification, the client processes the notification. In the example, the client component generates a user interface presentation (e.g., a dialog box or some other graphical user interface element) for display. For example, the user interface presentation can indicate a condition of the shared resource (e.g., an error condition to be presented to a user for remedying the error). But, any other processing is possible by specifying an appropriate function.

In one scenario, the appropriate user interface is identified by the client component with a notification type identifier (e.g., Globally Unique IDentifier) located in the listener properties, or located in the notification object itself. In example involving a client running in a session of a terminal server, the generated user interface can be presented at a remote terminal.

Multiple iterations of receiving 504 and processing 506 can be performed. If desired, and no further notifications are expected from the notification server, the client can request the notification server to close the registered listener properties at 512. Additional notifications can be received by re-registering. In one scenario, the client is processing other computing tasks, and the lifespan of the component is not limited by how long the client is registered to receive notifications from any one shared resource.

EXAMPLE 11

Exemplary Shared Resource Registration and Notification Method

Figure 6:
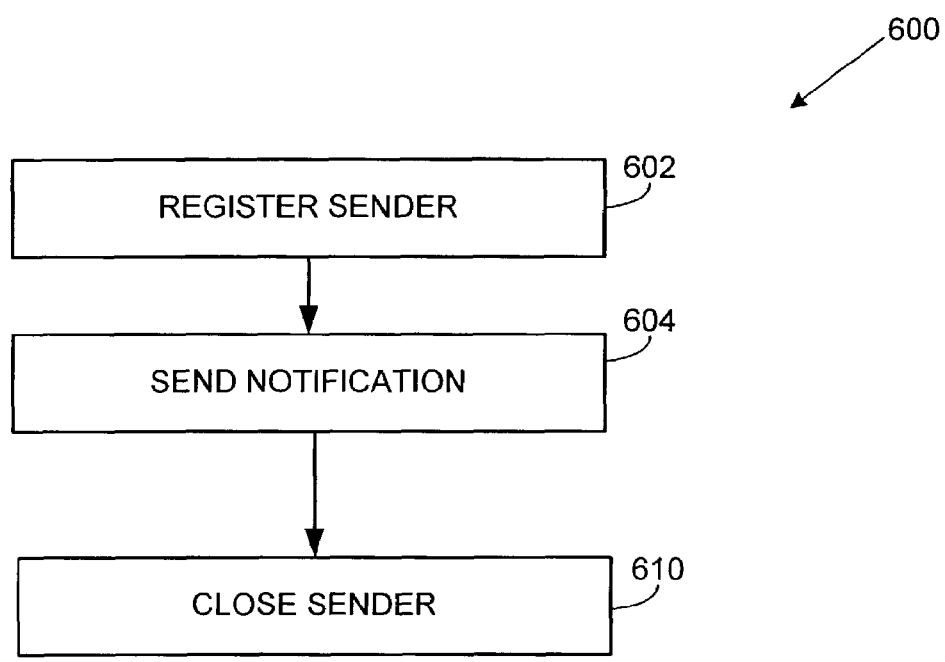
FIG. 6 is a flow chart of a method for registering a sender to send notifications.

FIG. 6 shows an exemplary method 600 executed by a shared resource for registering sender properties for sending notifications. In one scenario, the shared resource is a print component running in a print spooler. In another scenario, the spooler is a notification server hosting a print component shared resource. In another scenario, the shared resource is a print driver running on a computer shared by several users, and the users can switch between user states without logging on or off. A shared resource typically provides resources to plural requesting clients which register for notifications from a notification server.

At 602, the shared resource registers one or more sender properties with the notification server. The sender properties can be obtained from the shared resource (e.g., via parameters) or otherwise obtained (e.g., by determining in which session the shared resource is running).

At 604, the shared resource sends a notification to the notification server. Such a notification may end up being forwarded to one or more clients having appropriate registered properties. More than one notification can be sent via iteration of sending 604.

If desired, and no further notifications are to be sent, the method closes the registration with the notification server at 610. Additional notifications can be sent by re-registering.

EXAMPLE 12

Exemplary Techniques for Obtaining Sender/Listener Properties

In any of the examples, sender/listener properties stored for a registration can be obtained in a variety of ways. For example, properties can be passed as parameters in the call that registers a listener or sender.

However, in some cases, it may be advantageous to obtain properties from a source other than the calling client. For example, the information can be obtained from information about a call from the client (e.g., the call that registers a listener or sender) or the client caller (e.g., the registering caller). Such information can be collected from system services (e.g., security or RPC services). For example, in the case of identity context properties, such properties can be so obtained.

In the case of a session identifier, a client calling the notification services (e.g., a notification server) can specify that it wishes to register for notifications for the same session in which it is running. The session can be determined by obtaining information about the registration call or registering caller (e.g., from the RPC subsystem). A similar approach can be used for user identifiers or security contexts.

When calls for requesting services are received by a registering sender (e.g., a shared resource or a server hosting the shared resource), the information about the client call or calling client can be stored (e.g., in memory) for later retrieval. For example, when the shared resource subsequently wishes to register as a sender, it can specify that such stored properties be used. In this way, the shared resource can specify that it wishes to register to send its notifications to the same session on behalf of which the shared resource is running.

Properties can also be collected from other sources, such as the security context. For example, the security context may indicate for which user a system service is executing (e.g., which user the service is impersonating).

Further, collecting information from the registration call or registering caller can provide additional security because it can be used to ensure that a caller does specify that it wishes to listen for notifications for another session, user, or security context. In some cases (e.g., for calls associated with administrative rights), such a scenario may be acceptable, but in others, allowing such eavesdropping may be an undesirable breach of security and privacy.

EXAMPLE 13

Exemplary System Overview With Registrations

Figure 7:
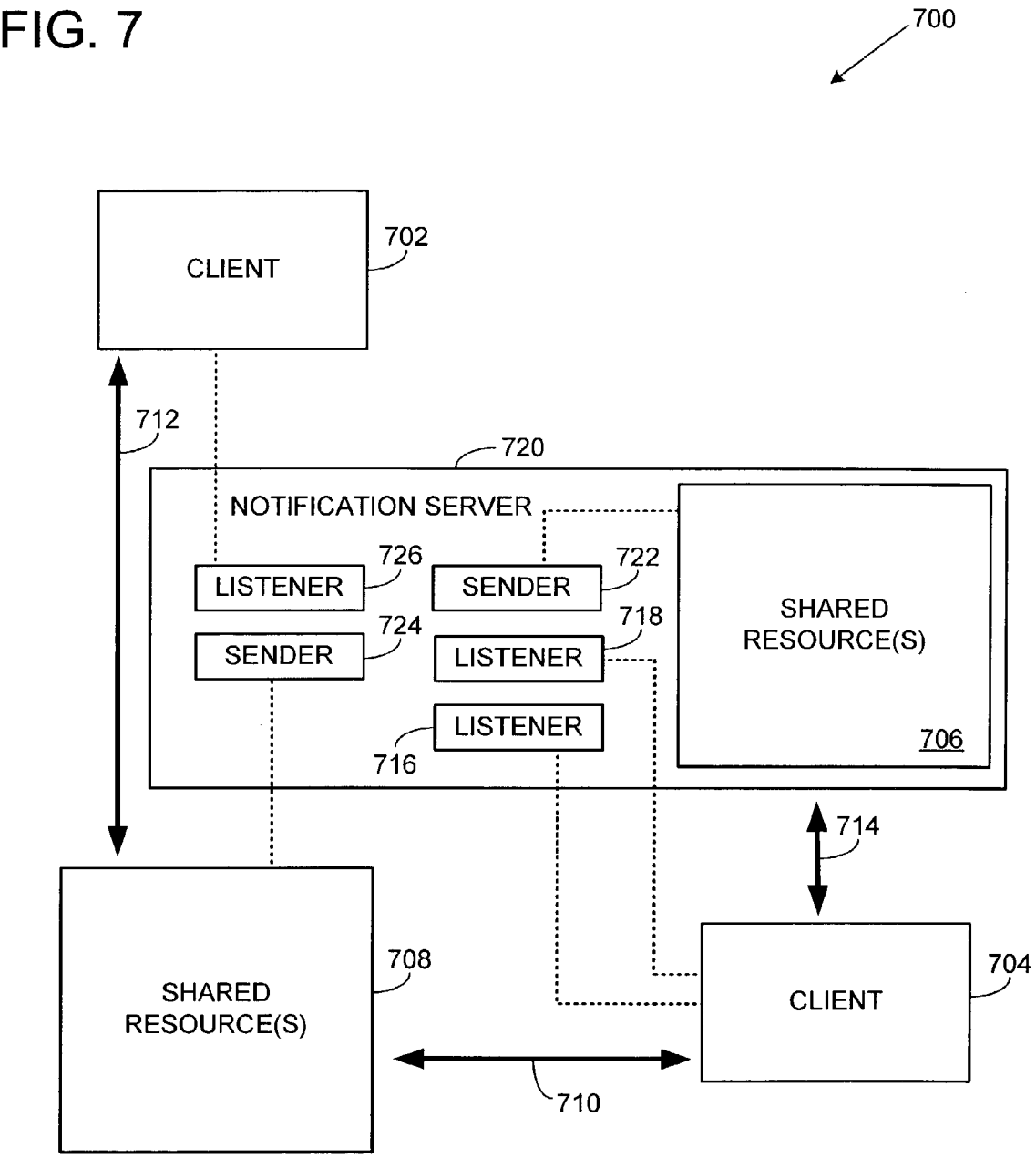
FIG. 7 is an exemplary system of client registrations for notifications from shared resources.

An exemplary notification system 700 is shown in FIG. 7. In the scenario 700, one or more clients 702, 704 utilize one or more servers 706, 708, where the servers provide one or more shared resources to clients. In the example, plural clients 702, 704 request services from plural servers 706, 708 offering shared resources. Additionally, a client 704 registers itself via listener registrations 716, 718 with a notification server 720, and a server 706 registers itself via sender registrations 722 with a notification server 720, and another server 708, registers itself via a sender registration 724 with the notification server. In this scenario, when a notification is generated by a server 706 having a registration 722, the notification server 720 compares properties stored for the registration 722 and properties stored for the registrations 718, 716, 726 in order to determine whether an indication of the message should be sent to zero or more clients.

In the example, the notification server 720 hosts one server 706 and supports a remote server 708 having an associated registration 724. In other scenarios, a notification server hosts plural servers, supports plural remote servers, or both. In the example, a client 704 has several listener registrations 716, 718. Such plural client registrations can be used (1) to receive different types of notifications from the same server, (2) to receive plural different notifications from plural different shared services hosted by the same server, (3) to receive notifications from plural servers hosted by the same notification server, (4) to receive plural notifications from shared resources hosted by plural servers, or some combination thereof.

Although not shown, a server can register plural sender registrations at the same notification server, for example, to send notifications for different notification types, or to send notifications from plural shared resources hosted by the server. Additionally, a server can register as a sender at plural notifications servers (also not shown), for example, when clients sharing a resource provided by the server are expected to be registering as listeners at potentially different notification servers.

EXAMPLE 14

Exemplary Terminal Server Notification System

Figure 8:
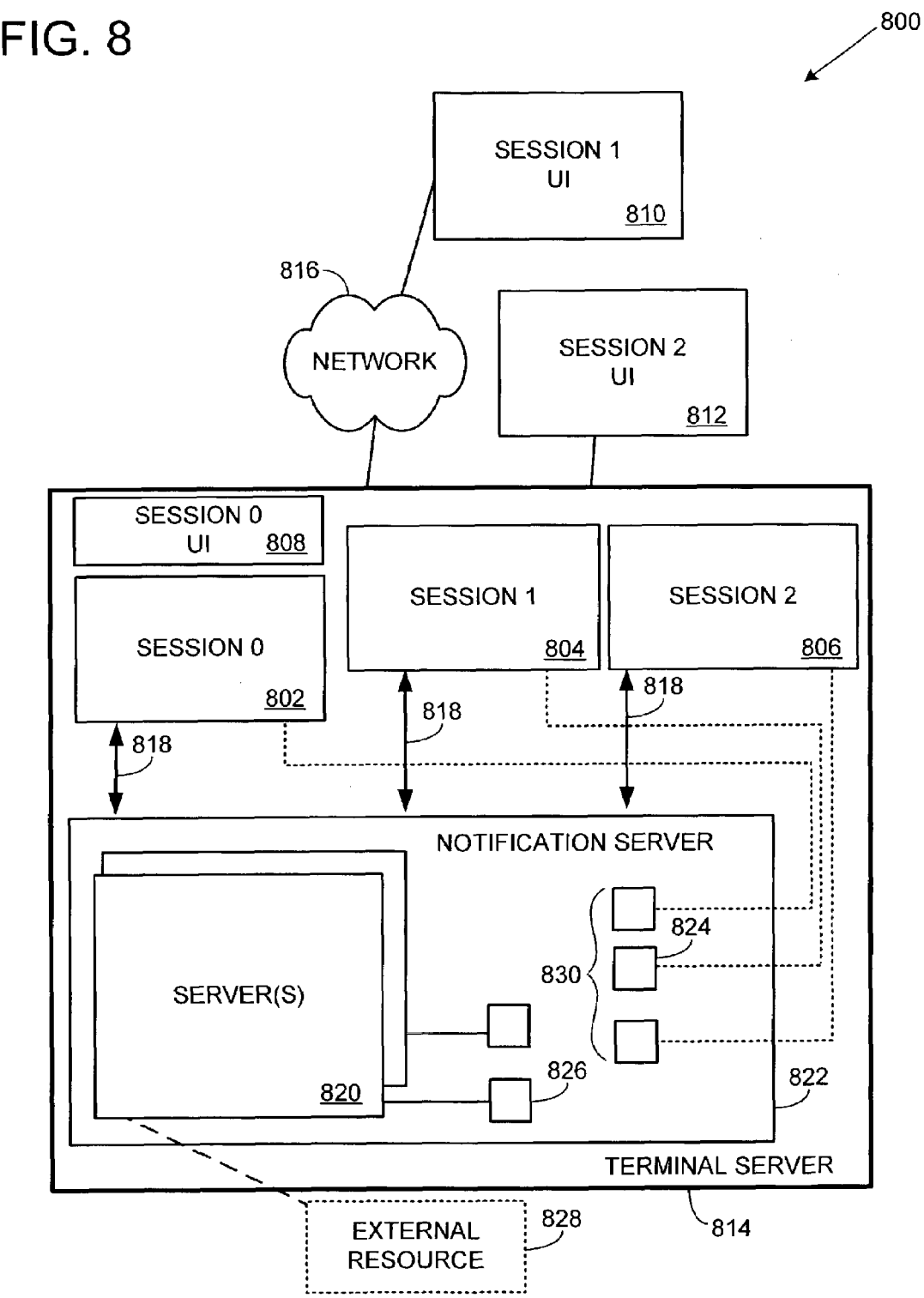
FIG. 8 is an exemplary terminal server system that includes registering clients to receive notifications from shared resources.

Another exemplary notification system 800 for use in a terminal server scenario is shown in FIG. 8. In the system 800, a terminal server 814 is executing plural sessions 802, 804, 806 and a notification server 822 that hosts servers (e.g., offering shared resources) 820. The notification server 822 could alternatively execute outside of the terminal server 814.

When a user logs onto a terminal server enabled computer, a session is started for the user. Processes executing for the session are associated with a unique session identifier. A special session identifier (i.e., "0") is associated with the console, and the user interface 808 for the console session 802 is typically displayed locally. Certain processes executing for a session (e.g., system services such as printing) are associated with the console, even if executed on behalf of another session.

In the example, a remote user is logged onto the terminal server from a remote terminal 810 through a network 816, and processing is accomplished in a session 804 (e.g., a process) assigned the session identifier "1." Another remote user is logged onto the terminal server from a remote terminal 812 through a dedicated connection to the terminal server 814, and processing is accomplished in a session 806 (e.g., a process) assigned the session identifier "2." In this terminal server scenario, plural client sessions 802, 804, 806, executing on the terminal server 814 access 818 shared resources 820. In the example, the shared resources 820 are hosted by a notification server 822.

The sessions 802, 804, 806 can create listener registrations 830 to receive appropriate notifications (e.g., notifications for the session registering). When receiving a request to create a registration, the session from which the request originates can be determined (e.g., via the RPC subsystem). In this way, a session can be prevented from registering for notifications from other sessions (e.g., eavesdropping on other sessions), unless the registration is created for an administrator. Also, the session can specify that it wishes to receive notifications for the same user, regardless of the session. Again, the user associated with the request can be determined in order to prevent registering for notifications for other users, unless the registration is created for an administrator.

Subsequently, when processing for a session accesses a server 820, a shared resource associated with the server 820 may wish to generate a notification. An appropriate sender registration 826 can be created beforehand or at the time the notification is to be sent. The notification can then be sent via the registration 826.

If the server 820 or shared resource is associated with the console 802 (e.g., it is a system service), it may have been initiated on behalf of another session 804, 806. When the session makes its call to the server 820, the session identifier related to the session initiating the call can be stored (e.g., in thread local storage). The session can be determined by obtaining information about the call. Subsequently, when a shared resource related to the server 820 wishes to register as a sender, the appropriate session identifier can be associated with the sender registration by referring to the stored identifier. In this way, the shared resource can send notifications to the session that initiated it, rather than to the console.

Upon receiving a notification from any of the shared resources for the servers 820, the notification server 822 compares properties registered for the shared resource 820 in the sender registration 826 with properties registered by the sessions with listener registrations 830, in order to determine whether to forward an indication of the notification to a registered session with matching listener properties. For example, if a listener registration indicates that notifications related to the same session as the listener are desired, such notifications are sent. Or, if a listener registration indicates that notification related to the same user as the listener are desired, such notifications are sent.

This allows multiple client sessions to share a shared resource and still receive notifications regardless of in which session the shared resource is executing when it generates a notification. For example, a session 804 may request a task be performed by the external resource 828 by sending an appropriate request to an associated shared resource (e.g., a server for the external resource) offered by a server 820. When the external resource 828 sends a message to the shared resource offered by the 820, an indication of that message can be sent back to the appropriate session 804, even if the shared resource offered by the server 820 was executing under the console session 802. Consequently, a message can be sent to the user interface 810 associated with the session 804 that requested the shared resource instead of the session "0" console.

In some cases, such an approach can offer enhanced security. For example, if the user of session 804 does not wish others to know of the activity associated with the external resource 828, sending a message concerning the resource 828 to the console user interface 808 can be a breach of security or privacy. Further, if the message is sent to the console instead of the user that initiated processing, the user at the console user interface 808 in some cases may be presented with options (e.g., to cancel or delete processing) related to the processing. By enabling the presentation of messages to the user interface 810 that initiated the processing, enhanced security and privacy can be provided.

EXAMPLE 15

Exemplary Terminal Server Notification System in Printing Scenarios

The exemplary notification system 800 shown in FIG. 8 can be used in printing scenarios to route messages relating to printing to the appropriate user or session in a terminal server environment.

For example, when starting a new session 804, a listener registration 824 for the shell (e.g., desktop) can be created to indicate that the shell wishes to receive any messages for the session related to printing (e.g., by specifying a notification type indicating printing notifications).

Subsequently, when printing is initiated (e.g., by a user request), printing services 820 are invoked and run in session 0. However, the printing services were invoked on behalf of a different session 804, and the identifier associated with the invoking session 804 can be stored in memory (e.g., thread local storage).

The external resource 828 may be a printer that sends a message (e.g., an out-of-paper notification) to the printer services 820 (e.g., comprising a print driver) to indicate that the printer is out of paper. The printer services 820 can create a sender registration 826 and send a notification related to printing (e.g., by specifying a notification type indicating a printing notification). The notification can indicate the session 804 for which the printing was initiated (e.g., by retrieving the stored session identifier). The notification can include an indication of a graphical message (e.g., a "printer out-of-paper" GUI), which is forwarded to the appropriate listener (e.g., for the same session that initiated the printing).

The session then processes the notification to send an appropriate user interface (e.g., a dialog box) to the user interface 810 associated with the session 804 that requested the shared resource (e.g., a print job) instead of the session "0" console. A user interface representation is displayed at the correct session user interface.

If desired, two-way communication can be accomplished by features described below. In this way, the user can select an option, and the option can be communicated back to the notification originator 820.

EXAMPLE 16

Exemplary Multiple Session Notification System for Switching User Scenarios

Figure 9:
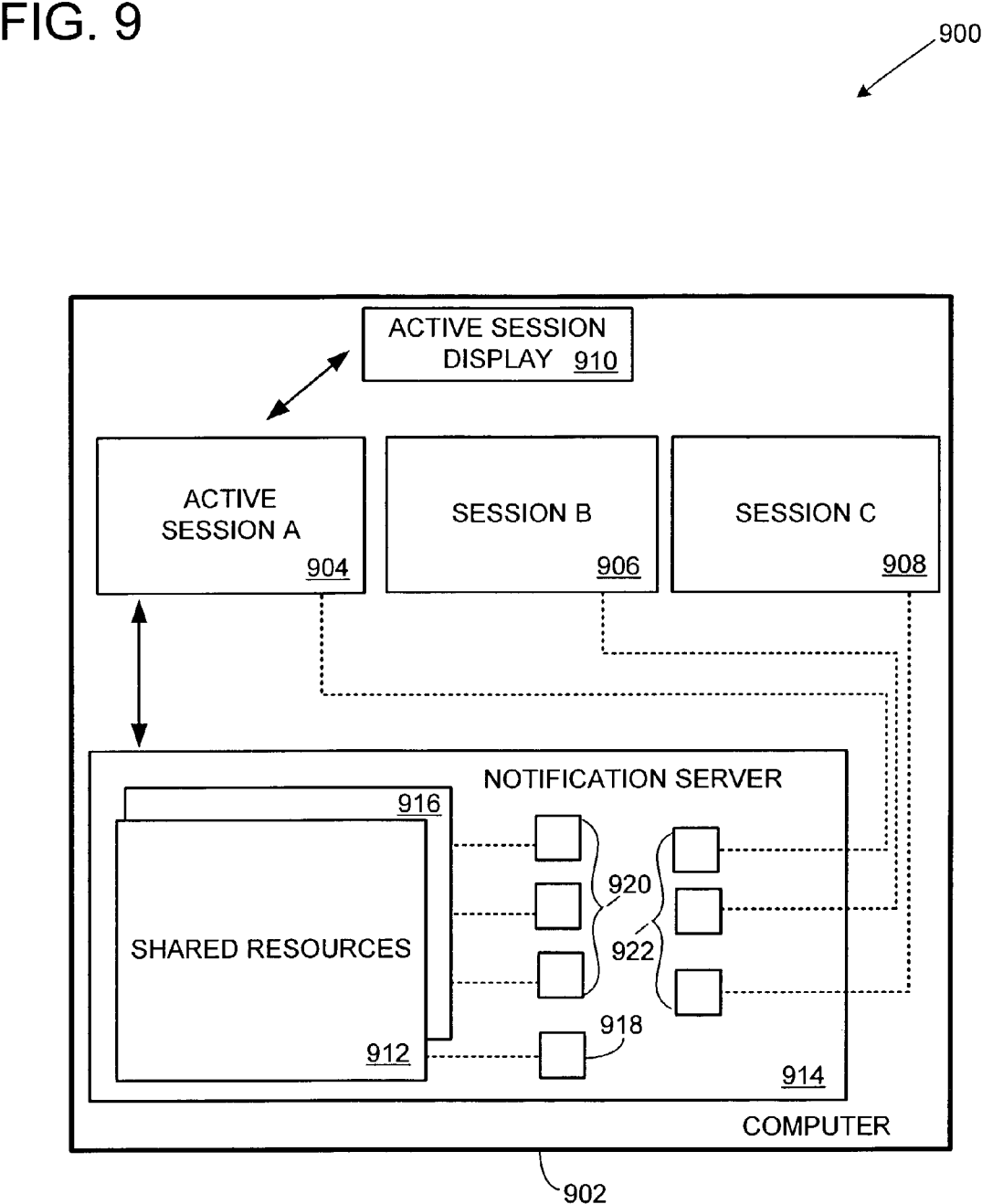
FIG. 9 is an exemplary multiple user switch system that includes registering user presentations to receive notifications from shared resources.

An exemplary notification system 900 for use in switching user scenarios is shown in FIG. 9. In the example 900, a computer 902 is executing a present session 904, and has state saved for other session(s) 906, 908. A user can switch to another active session 906, 908 by invoking a switch command (e.g., via pointer or keyboard actions). In practice, each session is associated with a different user name, but switching can be accomplished without logging off the current user.

When the computer spawns a new session to utilize a shared resource 912, 916, the session 904, 906, 908 creates appropriate registrations 922 to receive notifications (e.g., related to its session). As shown, shared resource(s) 912, 916 are available to the sessions 904, 906, 908. If the shared resources 912, 916 wish to send notifications to any of the sessions 904, 906, 908 (e.g., the session that invoked it), the shared resource 912, 916 can create an appropriate sender registration 918, 920. When a shared resource generates a message, the notifications server 914 determines whether properties registered by the shared resource 918, 920 match with properties registered by a session(s) 922 (e.g., whether the session identifiers match). If so, an indication of the notification (e.g., the notification itself) is forwarded to the corresponding session(s) 904, 906, 908.

For example, an active session can request access to a shared database resource and then become inactive (e.g., the computer 902 switches to another user). The database may then generate a notification that results in a user interface notification message for the inactive session. In such an event, the notification server determines from the registered properties that the message (e.g., notification) is intended to be delivered not to the present active session, but instead to a presently inactive session and does so. The next time the intended session becomes the active and is shown in the active display 910, the reactivated session displays an indication of the message.

EXAMPLE 17

Exemplary Filters

Figure 10:
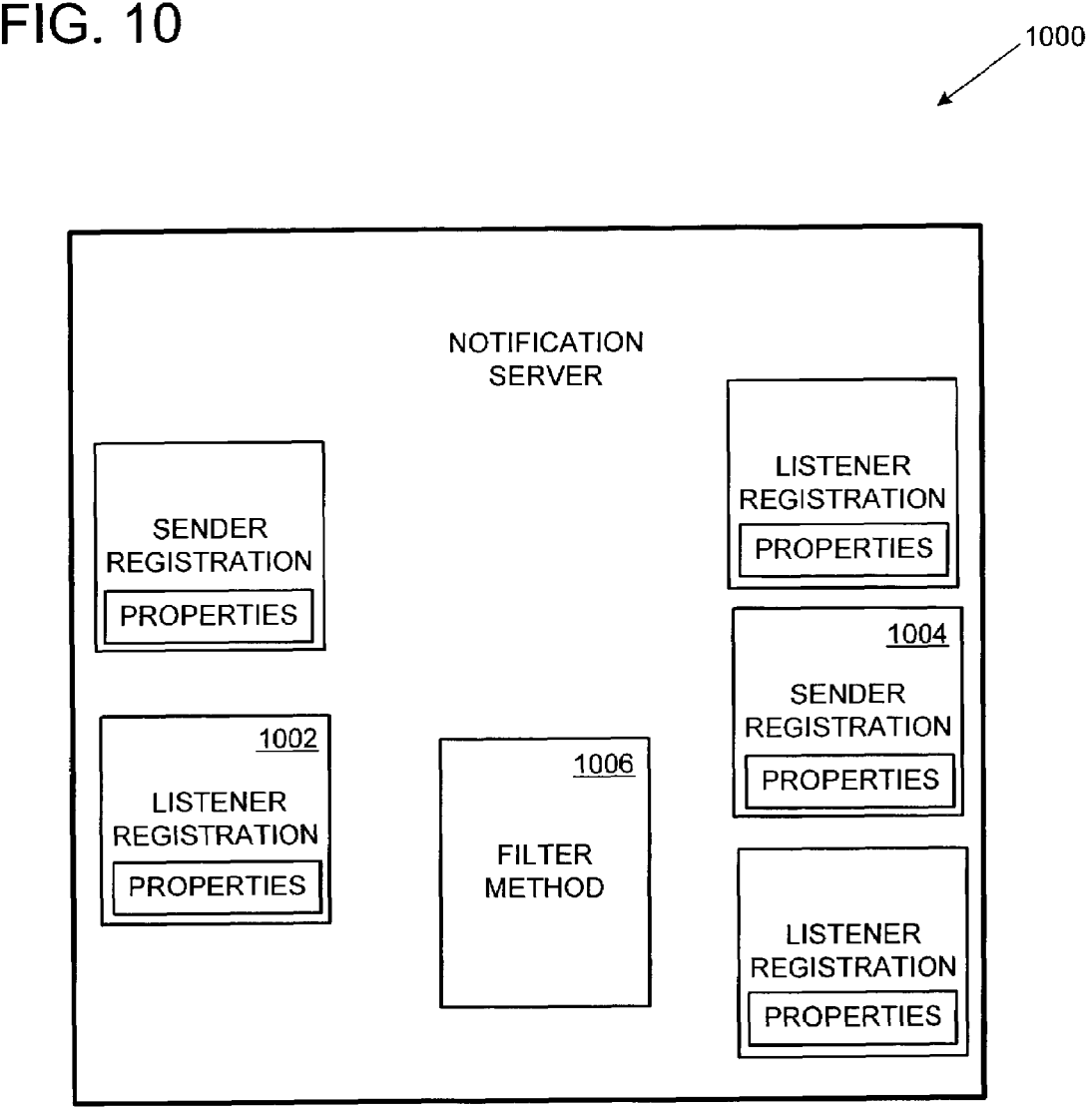
FIG. 10 is an exemplary notification server showing one or more registration properties potentially used to filter notifications.

FIG. 10 shows an exemplary notification server 1000. In the example, a client (not shown) creates a listener registration 1002 to receive notifications from a shared resource, and a shared resource (not shown) creates a sender registration 1004 to send notifications to registered listeners. In any of the examples described herein, when a notification is generated by a shared resource, a filter 1006 can be used to determine whether the notification matches properties for a corresponding listener registration. Properties considered by the filter can include any of the listener or sender properties described herein.

A match can be defined in a variety of ways. For example, two registrations can be defined as matching if a subset of the properties are identical. The match can be based at least on an identity context property (e.g., whether the registrations have identical properties). In certain cases, any property may be considered to match. For example, a registration may indicate that notifications in any session for a particular user are to be forwarded. A registration in any session for the user would be considered a match in such a case.

In one scenario, a client component can specify that it is interested in all types of notifications (e.g., by specifying a "NULL" notification type for the listener registration). The filter will then forward notifications of all types to the registered listener.

Additionally, some properties can affect the behavior of the registration and related notifications. For example, a sender registration property (e.g., notification type) can indicate how a listener processes a received notification and can affect how a listener registers for the notification. For example, during registration, a client can use such information when setting up a listener registration (e.g., by negotiating with the sender registration over which types of notifications are available or desired). A communication type property can indicate whether communications between a client and a shared resource are bidirectional or unidirectional. A notification type property can indicate the type of notification, whether a reply is expected by a shared resource, or both. The notification type property can also serve to identify the logic to be used to process the notification.

In one scenario, a client registers a listener property in the form of the client's security context identifier. The security context identifier can be determined by inspecting the call from the client (e.g., via the remote procedure call "RPC" subsystem). When a shared resource accepts a service request from the client, the shared resource may run in the security context of the client (e.g., via impersonation). When the shared resource generates a notification, the notification is associated with the security context (e.g., the security context identifier) in which the shared resources is running (e.g., by including the identifier in the message or by determining the identifier when the shared resource calls to register). In this scenario, because the security context of the shared resources matches the security context of the client requesting the service, an indication of the notification is forwarded to the client.

The client can use notifications to generate an on-screen user interface representing the notifications. In one such example, the client uses a notification type contained in the message to identify a routine (e.g., by specifying a dynamic link library "DLL") that displays the correct message. The on-screen interface representing the notification can be displayed on a terminal associated with the client, whether the terminal is local or remote.

Impersonation is the ability of a thread to execute in the security context of a thread that is different from the security context of the process that owns the thread. When running in the client's security context, the server appears to be the client. This allows access checks to be performed against the client's identity. Using the client's identity for access checks can cause access to be either restricted or expanded, depending on the client's permission level.

In another scenario, a client registers listener properties in the form of the client's security context along with the terminal session identifier. The properties can be obtained based on the call from the client (e.g., via the RPC subsystem). In such a scenario, when the shared resource accepts a service request from the client, the shared resource runs in the security context of the client. However, the session assigned may be the console session. Accordingly, the session identifier of the calling client can be stored for later retrieval.

Subsequently, when the shared resource generates a notification, the notification message and/or the sender registration for the shared resource includes the security context in which the shared resources is running, and the terminal session that requested the shared resource (e.g., the terminal session on behalf of which the shared resource is executing). Because the security context of the shared resource and the terminal session stored for the shared resource matches the registered listener properties, the notification server filter results in an indication of the notification to be forwarded to the client.

EXAMPLE 18

Exemplary User Filter

Figure 11:
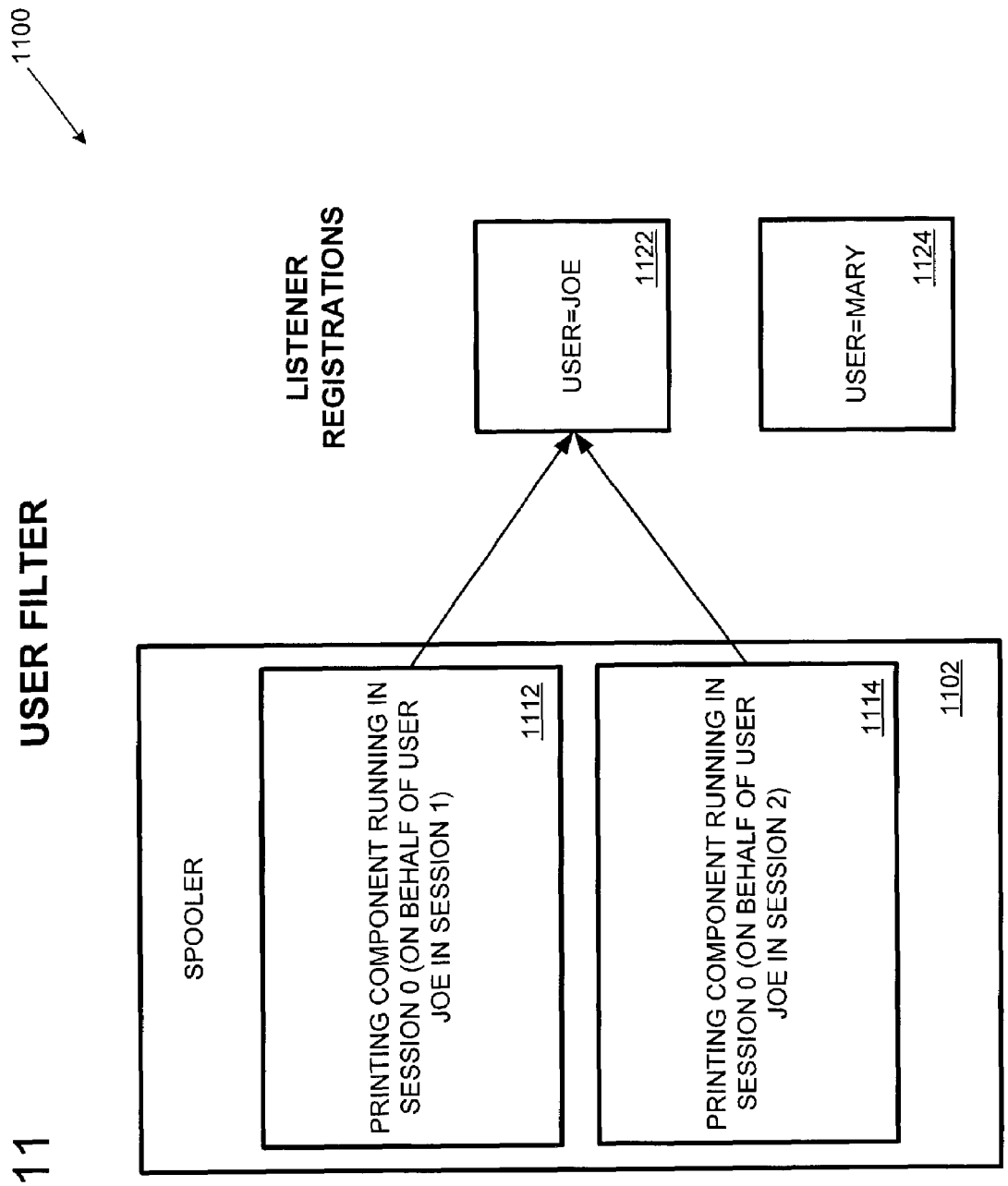
FIG. 11 is an exemplary system that filters notifications based on a user identifier.

The following examples show filters in various printing scenarios, but the technologies can be applied to other scenarios in which notifications for shared resources are useful. An exemplary notification system 1100 is shown in FIG. 11. In this scenario 1100, clients have listener registrations 1122, 1124 to receive notifications from a shared resource in the form of a print component (e.g., print driver, port monitor, language monitor, etc.) hosted by a notification server in the form of a print spooler server 1102.

In the example, the listener registrations 1122, 1124 are set up with an identity context identifier in the form of a user identifier (shown as "Joe" and "Mary," but can be in some other form to identify a user). The user Joe is running two terminal sessions, both of which have requested services causing components 1112, 1114 to execute (e.g., at the same or different times) in a spooler server 1102. The components 1112, 1114 impersonate Joe, and are associated with sessions different than "0," but because they are hosted by a system service, they run in the console session (i.e., "0"). In the example, when the components 1112, 1114 wish to send notifications, they can create appropriate registrations and send the notifications. The notifications for either or both of the components 1112, 1114 are passed to the client associated with the listener registration 1112 because the registration specifies the user Joe.

EXAMPLE 19

Exemplary Security Context Filter

Figure 12:
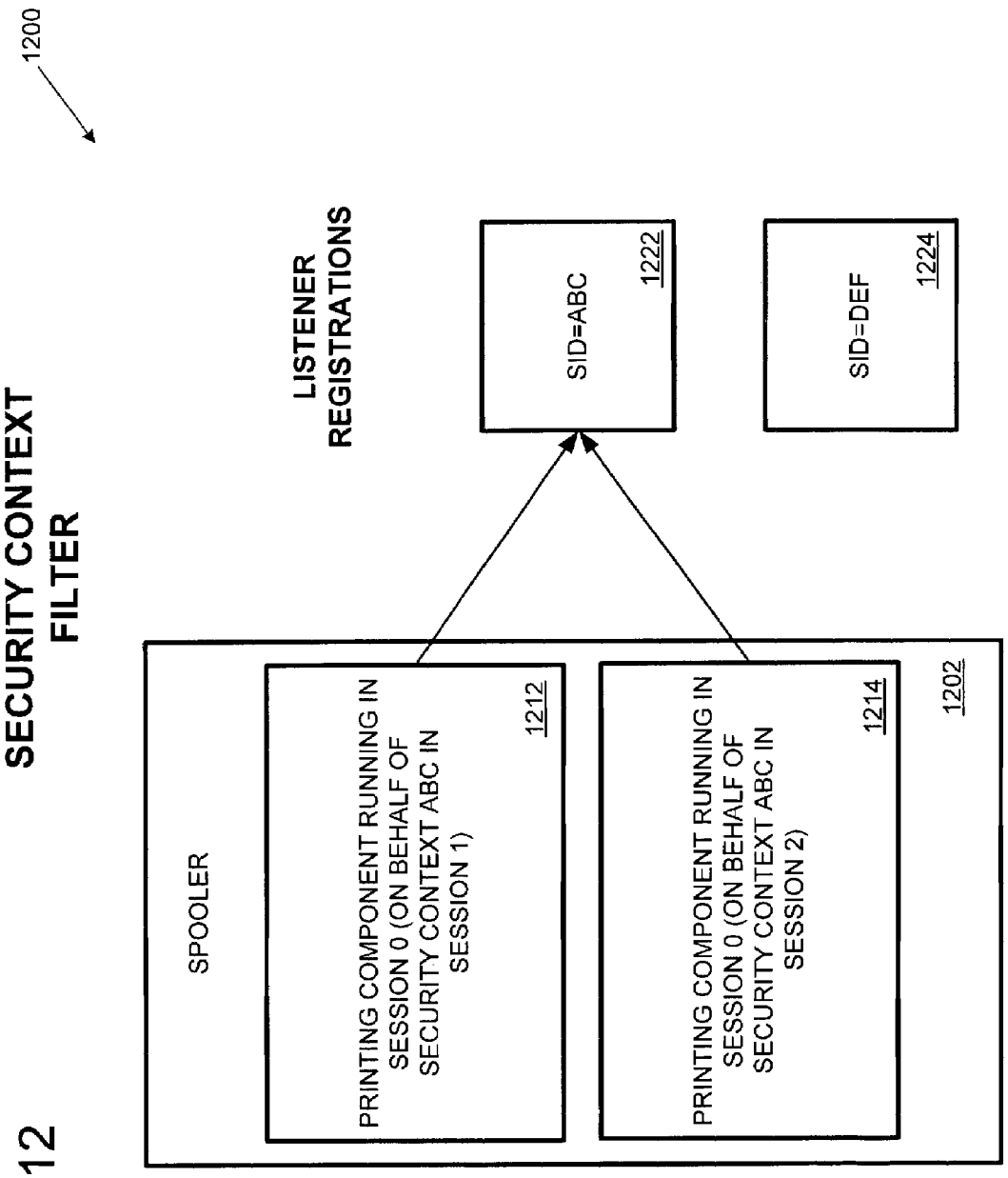
FIG. 12 is an exemplary system that filters notifications based on a security context.

An exemplary notification system 1200 is shown in FIG. 12. In this scenario 1200, clients have listener registrations 1222, 1224 to receive notifications from a shared resource in the form of a print component (e.g., print driver, port monitor, language monitor, etc.) hosted by a notification server in the form of a print spooler server 1202.

In the example, the listener registrations 1222, 1224 are set up with an identity context identifier in the form of a security identifier (e.g., an SID, which is shown as "ABC" and "DEF", but can be in some other form to identify a security context) to specify that notification for a particular security context are to be received. Two terminal sessions are running under the security context ABC, and both of the session have requested services causing components 1212, 1214 to execute (e.g., at the same or different times) in a spooler server 1202. The components 1212, 1214 run in the security context ABC but are associated with the console session (i.e., "0") because they are hosted by a system service.

In the example, when the components 1212, 1214 wish to send notifications, they can create appropriate registrations and send the notifications. The notifications for either or both of the components 1212, 1214 are passed to the client associated with the listener registration 1212 because the registration specifies the security context ABC.

EXAMPLE 20

Exemplary Session Filter

Figure 13:
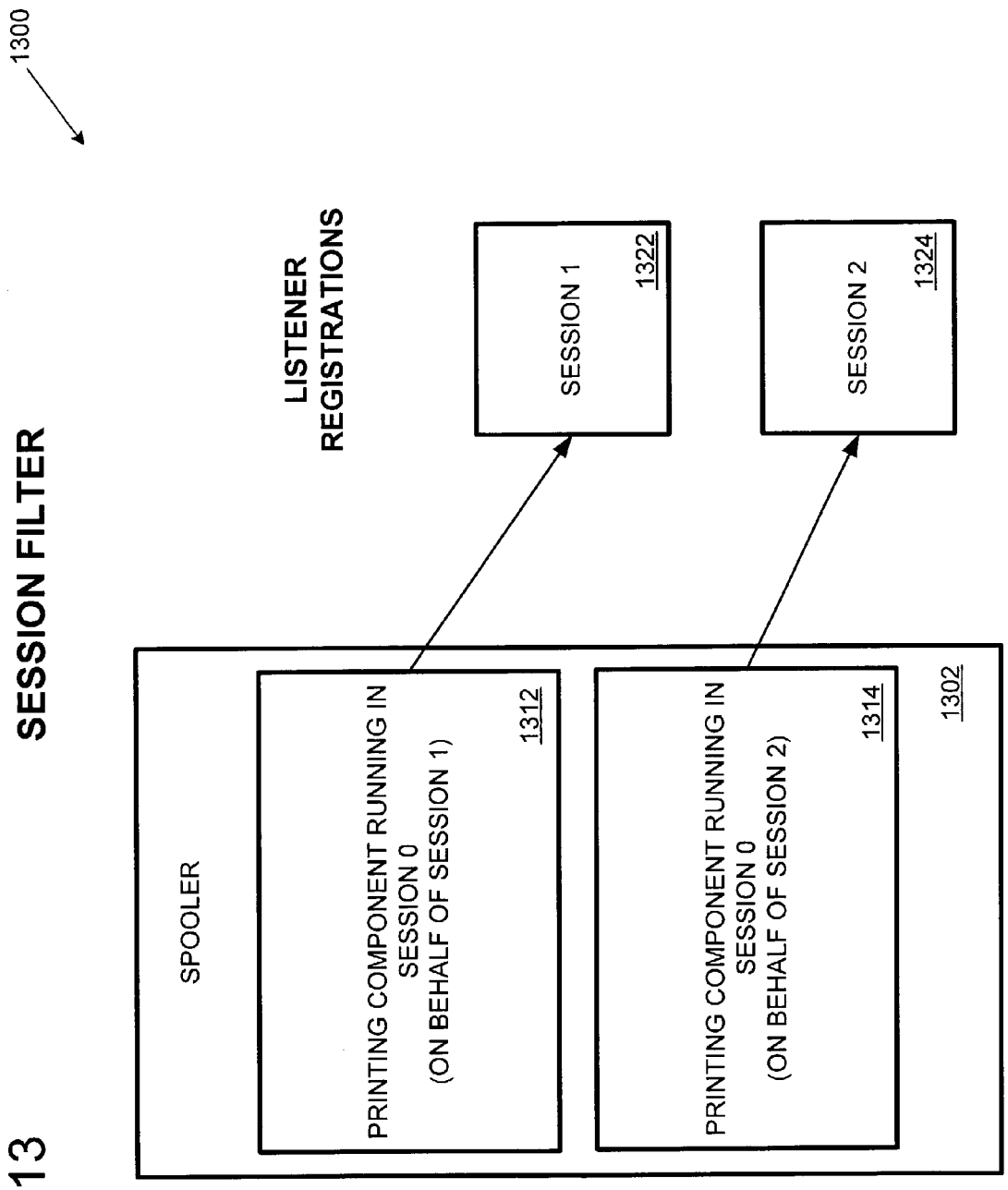
FIG. 13 is an exemplary system that filters notifications based on a session identifier.

An exemplary notification system 1300 is shown in FIG. 13. In this scenario 1300, clients have listener registrations 1322, 1324 to receive notifications from a shared resource in the form of a print component (e.g., print driver, port monitor, language monitor, etc.) hosted by a notification server in the form of a print spooler server 1302.

In the example, the listener registrations 1322, 1324 are set up with an identity context identifier in the form of a session identifier (e.g., for a terminal server, which is shown as "1" and "2", but can be in some other form to identify a session to specify that notifications for a particular session are to be received). Two components 1304, 1312 are running in the spooler 1302, and the components are running (e.g., at the same or different times) under the console session because they are related to a system service. However, the components 1304, 1312 are running on behalf different sessions (e.g., having user interfaces presented at the same or a different machine than that on which the spooler 1302 is running), and the session for which the component is running has been stored (e.g., as described in the examples herein).

In the example, when the components 1312, 1314 wish to send notifications, they can create appropriate registrations and send the notifications. The notifications for the component 1312 that executes on behalf of the first session are forwarded to the client associated with the registration 1322 for the first session, and notifications for the component 1314 that executes on behalf of the second session are forwarded to the client associated with the registration 1324 for the second session because the registrations specify a session matching that associated with the notifications.

EXAMPLE 21

Registering Mixed Property Filters

Figure 14:
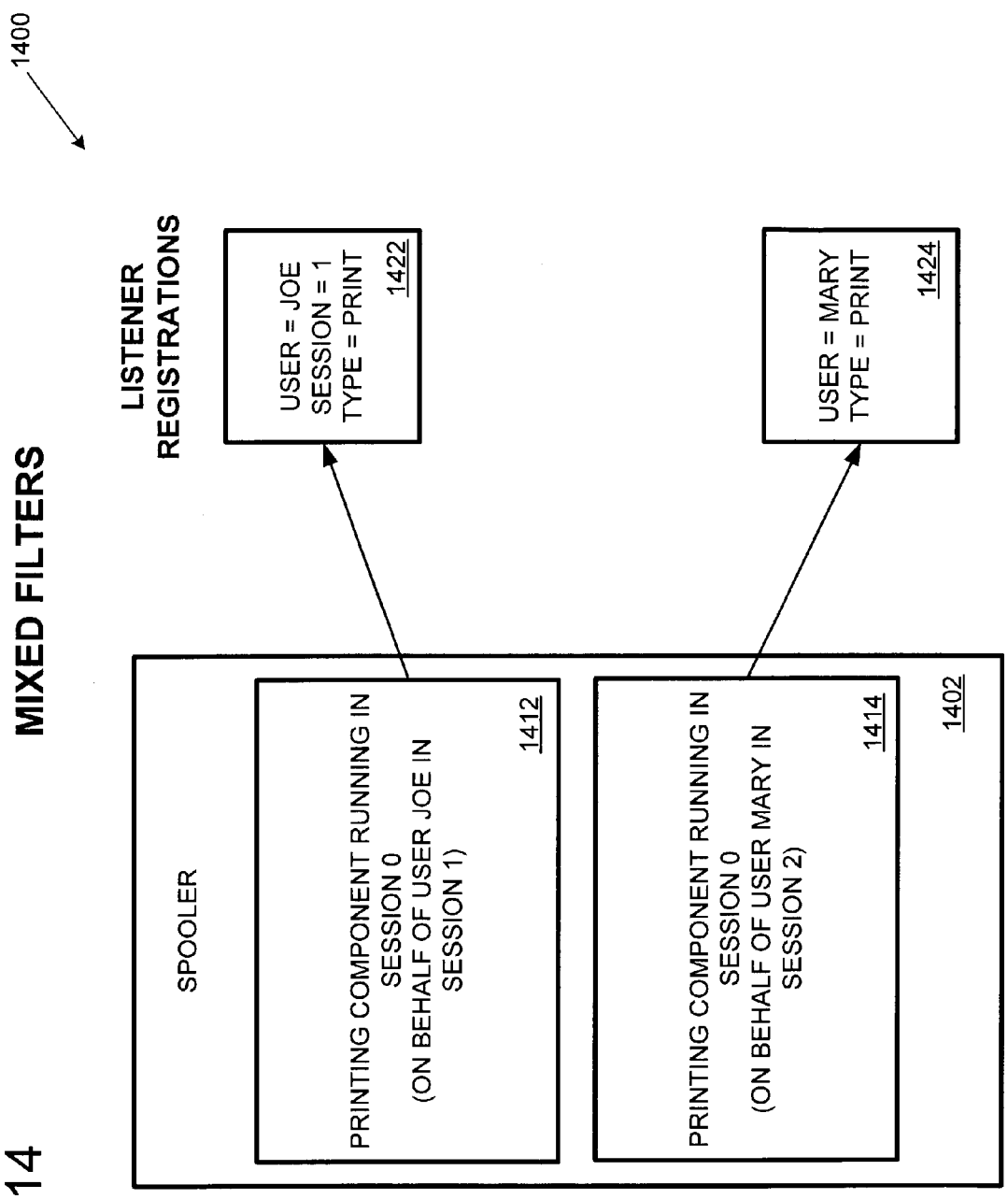
FIG. 14 is an exemplary system that filters notifications based on plural properties.

A filter can also specify any combination of more than one of the exemplary properties described herein. An exemplary notification system 1400 is shown in FIG. 14. In this scenario 1400, clients have listener registrations 1422, 1424 to receive notifications from a shared resource in the form of a print component (e.g., print driver, port monitor, language monitor, etc.) hosted by a notification server in the form of a print spooler server 1402.

In the example, the listener registration 1422 is set up to receive notifications relating to the user Joe, if in session 1 and of type "print." The listener registration 1424 is set up to receive notifications relating to the user Mary if of type "print." The actual property values (e.g., Joe, Mary, 1, and print) can be of a different form. The two components 1404, 1412 are running in the spooler 1402, and the components are running (e.g., at the same or different times) under the console session because they are related to a system service. However, the components 1404, 1412 are running on behalf of different sessions, and the session for which the component is running has been stored (e.g., as described in the examples herein).

In the example, when the components 1412, 1414 wish to send notifications, they can create appropriate registrations and send the notifications. As part of the registration process, as part of the notification itself, or via some other mechanism, the components 1412, 1414 can specify a notification type. In the example, both of the components 1412, 1414 send notifications of type "print."

The notifications for the component 1412 that executes on behalf of user Joe and on behalf of the first session are forwarded to the client associated with the registration 1422 for the first session because there is a match for the notifications. The notifications for the component 1414 that executes on behalf of user Mary and on behalf of the second session are forwarded to the client associated with the registration 1424 because there is a match for the notifications. If notifications of a type other than "print" are sent, they would not be forwarded for the registrations 1422, 1424 because there would not be a match.

In another scenario not shown, a client component registers a listener with plural filters, and a shared resource registers a sender with plural resources. In one such scenario, the filter method requires the plural properties match before forwarding the notification. For example, a client can set up a registration so that only notifications with the following matching filter properties are forwarded: session identifier, security context identifier, computer identifier, and notification type.

EXAMPLE 22

Administrators and Property Filters

Figure 15:
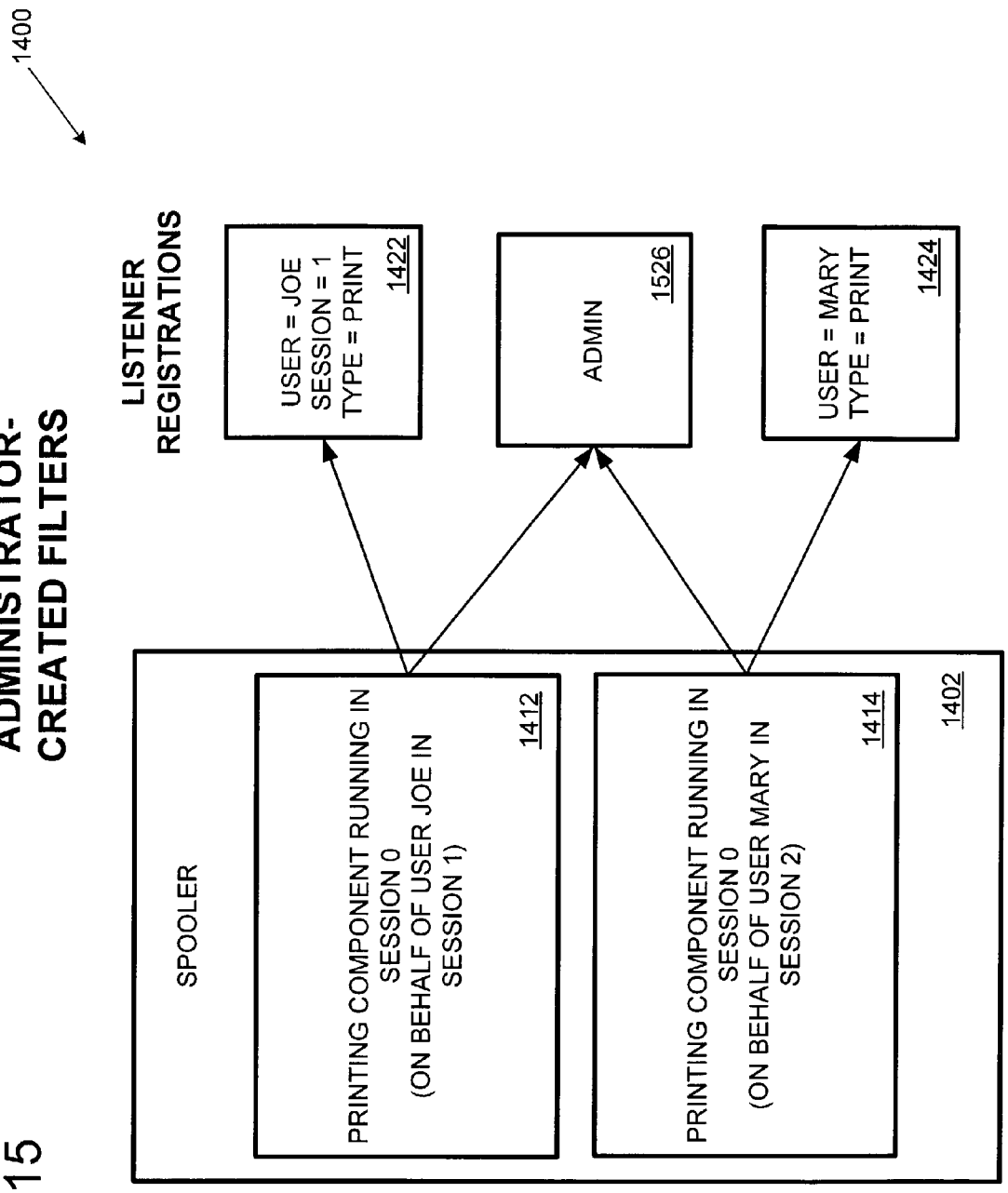
FIG. 15 is an exemplary system that includes a registration created by an administrator.

FIG. 15 shows the exemplary notification system 1400 of FIG. 14. However, in the example, a user with administrator rights has created a registration 1526, which is to receive registrations for any user in any session and of any type. Alternative administrator registrations can be created (e.g., to receive notifications for a particular user, a particular session, and the like). The system 1400 allows the administrator to create such a registration based on the privileged rights of the administrator.

The system 1400 proceeds as described above, but also sends the notifications to the client associated with the registration 1526. In this way, an administrator can monitor registrations, regardless of the user, security context, or session.

In addition, an administrator may be permitted to register non-administrative clients to receive notifications for other users/sessions.

In this way, an associated user interface generated for a notification can be directed to the local or remote machine associated with the terminal session where the administrator is registered to receive such notifications.

EXAMPLE 23

Channels and Independent Life Spans

A mechanism called a "channel" can be used to accommodate communicate notifications. If desired, such a channel can be set up to be bi-directional so that two-way communication between a client and shared resource can be accomplished. A channel can be implemented as part of a sender registration. The channel features described can thus also be performed on a sender registration (e.g., a sender registration component).

A shared resource component can open a channel component regardless of whether there are any listener registrations. After the channel is opened, the shared resource can send notifications via the channel component. If there are no registered listeners, then the channel component interface call will still succeed, but the call output (e.g., HRESULT) will indicate that no listeners received the notification.

For example, a printing component loaded by a spooler can register to send notifications with a printer or with a server (local or remote), regardless of whether there are any opened channels. Similarly, a client component can register to receive notifications with a printer or with a server (local or remote), regardless of whether there are any opened channels. Once a channel is opened and a notification is sent, the listening client will receive the notification, and for bidirectional communications, a channel component interface for returning a reply. Thus, the life spans of listener components and channel components, are independent.

The channel feature can be used as part of the filtering process (e.g., a channel can be set up to send notifications of a particular type). In a bi-directional scenario, filters can be used to specify the types of replies the sender is interested in receiving.

EXAMPLE 24

Interfaces for Shared Resources and Listeners

Figure 16:
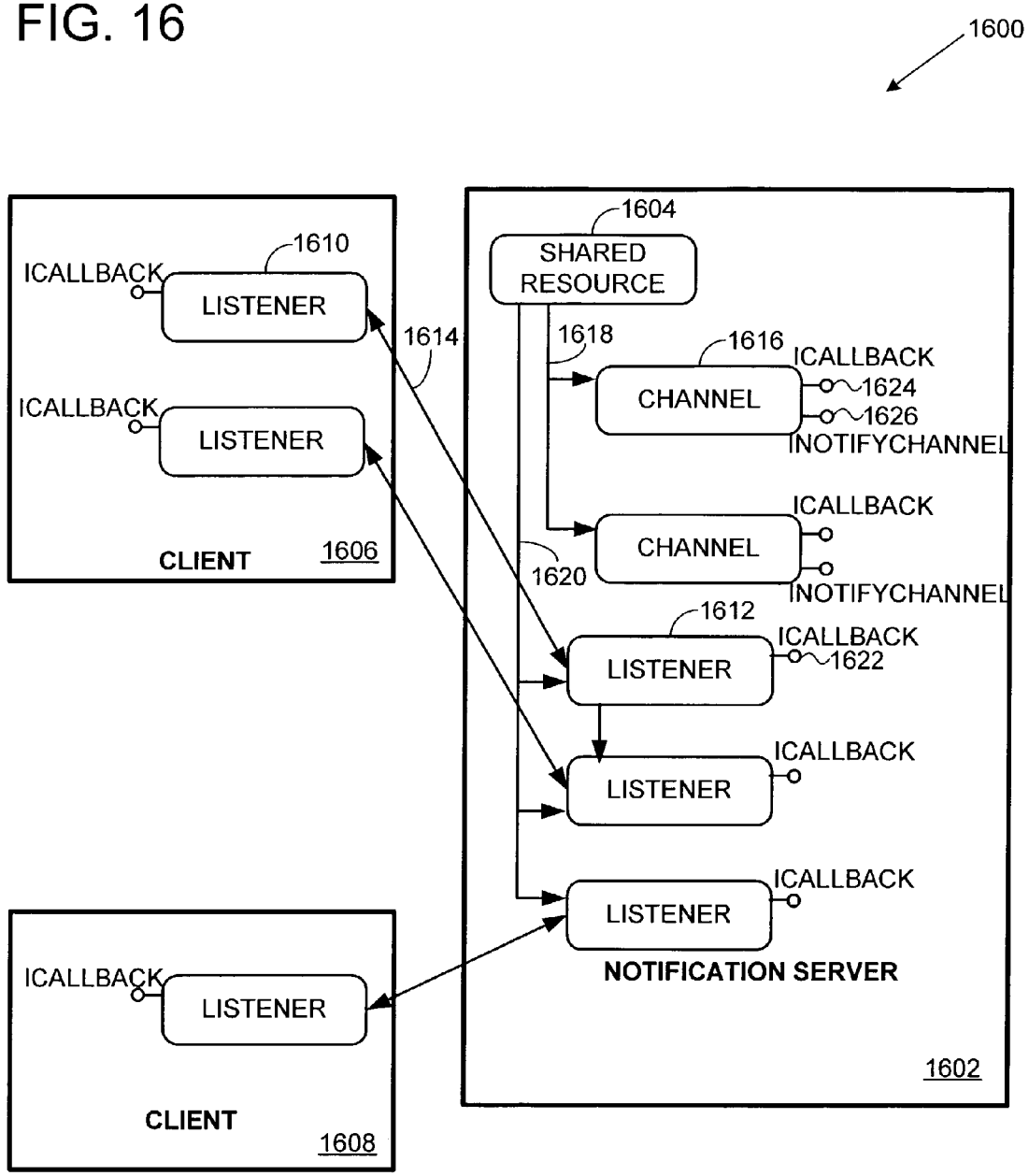
FIG. 16 is a diagram of objects and interfaces for an exemplary listener and channel registration.

An exemplary notification system 1600 is shown in FIG. 16. In the example, a notification server 1602 hosting a shared resource 1604 is shown. The client components 1606, 1608 and a shared resource 1604 are matched based on comparisons of properties registered in listeners and channels, whether on the same or different machines.

In one scenario, client components request services from a shared resource of a server that processes the requests received from the clients asynchronously. The client components 1606, 1608 send requests to a server and then do not wait as the server performs the service. Rather, a client component 1606 registers for notifications that may come at a later time from the server. In one example, the client component 1606 registers listener registrations 1610, 1612 that includes listener properties. The client components can run locally at the server or across the network. In one such scenario, communications 1614 are established by the runtime environment to support inter-process communication whether locally or over a network (e.g., RPC, COM, DCOM, etc.).

Client components can be running in the process space of the shared resource or in another process space. The client components can run on the same machine or on a different machine than the shared resource. In one such scenario, the spooler supports interfaces that allow spooler hosted components (e.g., print processors, drivers, monitors, etc.) to send notifications to applications running in different sessions locally; in another scenario, components can send notifications to both local and remote clients. In one such scenario, the notifications are print handle based, meaning that a spooler hosted component can request notifications to be sent to sessions that opened a print handle. The spooler supplies a set of interfaces that allow print components to send notifications, and a set of interfaces that allows applications (e.g., sessions, client components, etc.) to register to receive notifications.

In this scenario, the shared resource 1604 is hosted by (e.g., runs inside) the notification server 1602. The shared resource 1604 creates a channel component 1616 when it wishes to send out notifications. The client component creates a listener registration 1610, 1612 when it wants to receive notification objects. The shared resource keeps a logical list 1618 of the channel components opened and a logical list 1620 of the listener registrations (sometimes called "listener components") registered to receive notifications from the shared resource. In this case, inter-process communication 1614 is used to send the notification data across processes.

Listener components 1612 and channel components 1616 keep track of the notification type, communication type, user identity, session identifier, and machine identifier (e.g., registered listener/sender properties) associated with them. The notification server 1602 implements the logic of matching these properties between the channel and listener components, and sends the data only to those listeners that match the channel's properties.

Under this scenario, the listener components present an ICallBack interface 1622 that the notification server calls to pass in the notification data. The channel components present an INotifyChannel interface 1626 that the shared resource 1604 calls to send the notification data. To support bidirectional communication, the channel components present an ICallBack interface 1624 that the notification server calls to pass in the notification data sent back by the listener.

In this scenario, the notification data sent between the shared resource and the client component is identified by a notification type. The communication between the shared resource and the client component is unidirectional or bidirectional, and this is determined by a communication type.

In this scenario, the notification server is aware of the security context in which a shared resource and a client component execute. In such a scenario, the notification server is aware of the terminal session identifier and the user impersonation of the calls made to send or register for receiving notifications. In this scenario, this information is stored in the channel components and listener components.

In a specific scenario, a notification server defines and implements a set of interfaces that allow client components to register and un-register for receiving notifications. The registration is associated with a component inside the notification server, but the client components may exist anywhere on the network. Multiple registrations per shared resource component are supported. In such a scenario, the notification server supports a set of interfaces allowing shared resources to send the notification data. A notification server supports set of interfaces that client components implement and advertise at the time of registration. These interfaces are called by the notification server to pass the notification data through the registered listeners to the client component. For bidirectional communication, the notification server informs the client component, through the listener, about the channel component through which the notification data came. In such a scenario, the client component sends a reply notification back to the shared resource via the listener.

In one such scenario, the shared resource specifies the communication type it needs to establish with the potential listeners, the notification type of the data to be sent, and the desired security context of the listeners requesting the service. In this scenario, the client component specifies, via the listener component, the communication type, the notification type, and the security context of the shared resource. The notification server matches the criteria, and sends a notification only to those listener components that meet these criteria.

EXAMPLE 25

Interfaces for Sending Notification Objects

Figure 17:
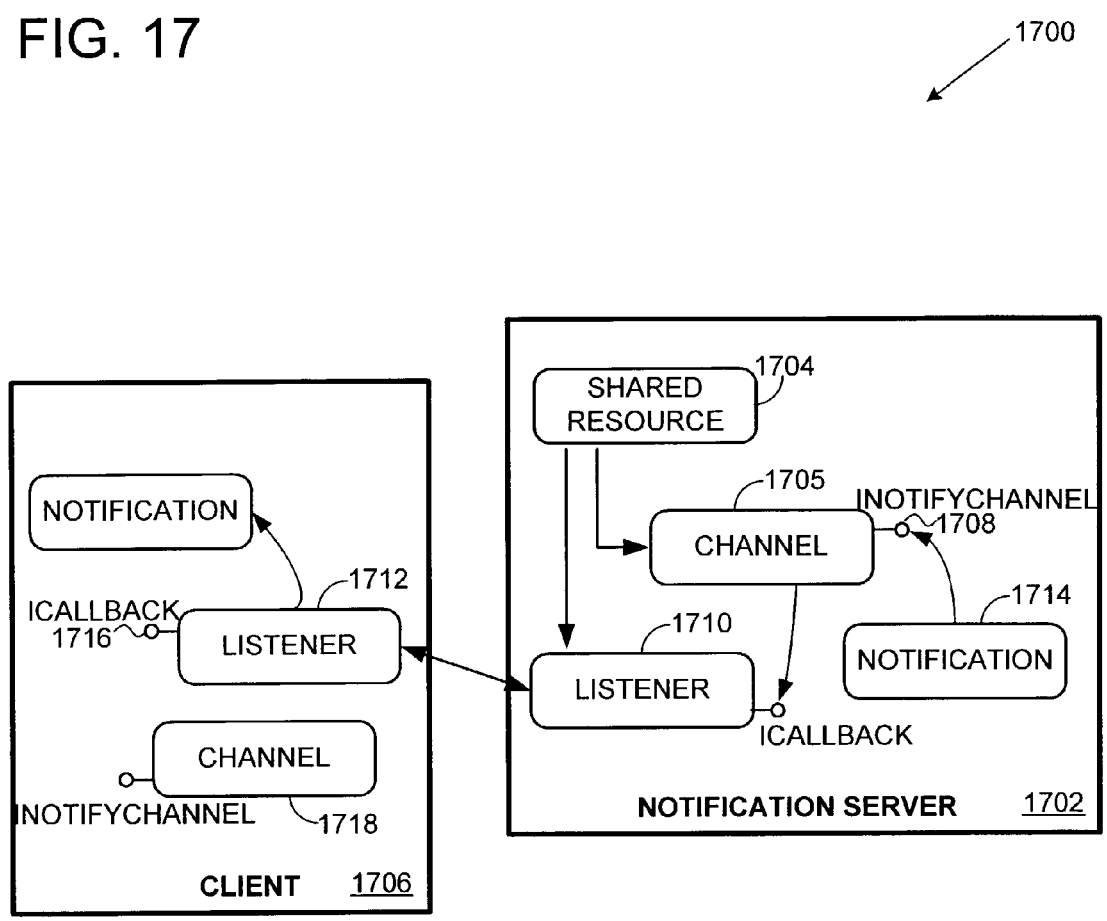
FIG. 17 is a diagram of objects and interfaces for an exemplary listener and channel registration, and a passed notification object.

An exemplary notification system 1700 is shown in FIG. 17. In this scenario, a notification server 1702 hosting a shared resource 1704 is shown. In this scenario, a client program 1706 and the shared resource are matched based on a comparison of properties registered in the listener and channel components.

For example, when a channel 1705 registers, it is "advertising" the types of filter properties available for registration. When a client later registers a listener 1710, 1712, these advertised filter properties can be used by the client during registration. In one example, the client determines that a channel is advertising that a filter property is available through the channel (e.g., a notification type). The client uses this "advertised" filter property to register for notifications of that type when they are sent by the shared resource 1704 that registered the channel.

In one scenario, a notification object 1714 flows between a shared resource 1704 and a client program 1706. The notification object is passed to the channel component 1705 through the INotifyChannel interface 1708. The notification server 1702 matches the properties of the channel component 1705 with those of the listener component 1712, and forwards the notification object 1714 to the listener component 1710. The listener components 1710, 1712 in the drawing below represent the same logical registration. Though inter-process communication, the notification object 1714 is passed to the listener component 1712, which is accessible by the client program 1706. On the client side, a logical representation of the channel component 1718 is presented to the listener if communication is bidirectional.

With the described interfaces, the notification object 1714 is sent from the shared resource to the client program 1706. In one scenario, a notification server will send whatever contents are presented to it in the form of a pointer to a binary object (e.g., binary large object or BLOB). In this scenario, developers for a client and a shared resource can agree in advance what the contents of the notification object will be and the data format. This format can be identifiable by the client and shared resource with a globally unique identifier. This global identifier can be a filter property used to register for and receive notification types. In this way, the notification server can send data without knowing (e.g., having logic for inspecting or recognizing) the content or format, but the content or format is pre-arranged by the client and share resource developers. In such a scenario, the notification server is said to be data content and format agnostic.

In one scenario, a spooler is unaware of the type of data sent between the listener and channel. The client component and the shared resource define the schema for the data sent through the channel. In practice, a markup language (e.g., XML) is used for defining the data schema, but the Spooler need not validate the data for integrity, other than possibly using a notification type (e.g., GUID) for filtering. This gives component programmers (e.g., shared resource components, listener components, channel components, and client components) the freedom to choose different data types and formats. In this scenario, the notification data is defined as a BLOB, and there is no validation made by the spooler against the data content. To process the notification data, appropriate logic (e.g., associated with the notification type) can be invoked.

For example, the notification type can be associated with a library of code (e.g., a DLL) having a function to process the notification data.

EXAMPLE 26

Interfaces for Sending Notification Reply

Figure 18:
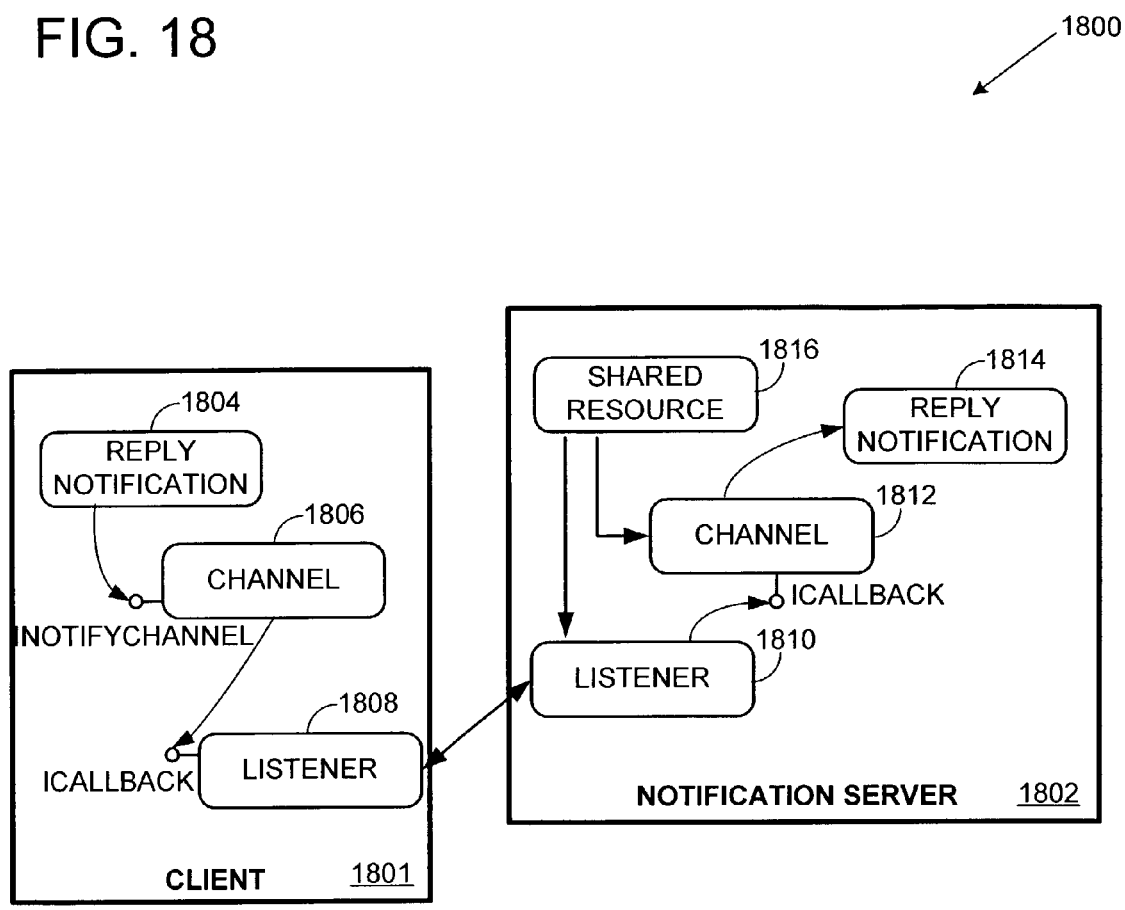
FIG. 18 is a diagram of objects and interfaces for an exemplary listener and channel registration, and a passed reply notification object.

An exemplary notification system 1800 supporting bidirectional communications for notifications is shown in FIG. 18. As shown, for bidirectional communication, the client program 1801 sends a reply notification to the shared resource via a presented logical channel component 1806. In such a scenario, the client component calls an INotifyChannel interface on the channel component 1806. The channel component calls the ICallBack interface on the logical listener component 1808 causing the reply notification to be transported back to the notification server 1802, where the listener component 1810 calls the ICallBack interface on the channel component 1812, which delivers the reply notification 1814 to the shared resource 1816. In this scenario, a client program 1801 sends a reply notification object 1804 to a notification server 1802 hosting the shared resource 1816.

EXAMPLE 27

Interfaces Supporting Registration and Notifications

An exemplary notification system includes a set of interfaces and types. The discussed interfaces can be implemented in an environment supporting various object models (e.g., objects conforming to the Component Object Model "COM" supported by Microsoft Corporation of Redmond, Wash.). In an environment supporting COM, the discussed interfaces can inherit from IUnknown. However, the technologies can be equally applied in other object models that may or may not support interfaces (e.g., any C++ or C++-like object model).

In the example, a service is a generic term referring to functionality implemented by a spooler either as part of the service itself (e.g., a spooler executable such as Spoolsv.exe) or as part of a client component or linked executable (e.g., Winspool.drv). A printing component refers to components loaded in the spooler executable, such as print processor, driver, and monitors. A listening client is a client component or spooler internal components with listeners registered to receive print notifications. A notification is the data sent through the notification channel between the printing components and listening clients. A channel component is a component created by the printing component when it wishes to send out notifications.

As shown below in Table 1, an exemplary session filter is used by a shared resource (e.g., a printing component such as a print processor, driver, monitor) when the shared resource requests the notification server to create a channel component. Thus, the session filter is an exemplary interface between printing components and the spooler process.

TABLE 1

Session filter

```
typedef enum {
   kAllNotification  = 0,
   kPerSessionFilter = 1,
   kPerUserFilter    = 2,
} ESessionFilter
```

In this scenario, with reference to Table 1, when the session filter is specified in an interface call by a shared resource (e.g., a printing component) to the notification server (e.g., spooler) requesting creation of a channel component, the session filter is assigned a value in the creation request. When the shared resource sets the session filter value at "1" (i.e., ESessionFilter=1), when a notification is received, the spooler sends the notification to any listeners running in the same session and user account (or impersonating the same user account) as the client component that opened the print handle. When the shared resource sets the session filter value at "2" (i.e., ESessionFilter=2), when a notification is received, the spooler sends the notification to any listeners running in the same user account (or impersonating the same user account) as the client component that opened the print handle. When the shared resource sets the session filter value at "0" (i.e., ESessionFilter=0), when a notification is received, the spooler sends the notification to any listeners interested in (i.e., registering for) receiving notifications from the printing component or server.

In this scenario, with reference to Table 1, when the session filter is specified in an interface call by a client requesting creation of a listener component, the session filter is assigned a value in the creation request. If the client component sets the session filter value at "1" (i.e., ESessionFilter=1), when a notification is received from session "1", the spooler sends the notification to the client component with session "1" registered. If the client component sets the session filter value at "2" (i.e., ESessionFilter=2), when a notification is received from a shared resource, the spooler sends the notification to any listeners running in the same user account (or impersonating the same user account) as the client component that made the registration. If the client component sets the session filter value at "0" (i.e., ESessionFilter=0), when a notification is received, the listener receives notifications sent to any session or listener component.

In this scenario, an Administrator is a user that has printer administration rights (e.g, PRINTER_ADMIN_RIGHTS) for the specified print component. As such, the Administrator can send notifications to and receive notifications from any component. However, the notification type filter is still enforced. For example, when a notification is sent from session "1" on a channel component registered with a kPerSessionFilter value. According to the kPerSessionFilter, the notification would otherwise be sent to session "1". However, if the Administrator running in session "2" is requesting, the notification will be sent to session "2", since there is an administrator listening, so long as the notification type is the same. However if the administrator sets the notification type property to "NULL", the administrator will receive the notification whether or not the notification type matches.

In this scenario, as shown in Table 2, by specifying a communication type, the printing component specifies whether a reply notification is expected back from the listener. Additionally, the communication type can specify how the spooler will handle the case when notifications are sent back from multiple clients.

TABLE 2

Communication Type

```
Typedef enum {
   kBidirectional = 1,
   // First response is handed to the
   // ICallback interface;
   // the client that first responded
```

TABLE 2-continued

Communication Type

```
    // will carry on the dialog.
    kUnidirectional = 0,
    // No response is handed to the
    // Callback interface.
    } ECommunication
```

In this scenario, there are two types of communications: bidirectional and unidirectional. In the unidirectional case, the listening client doesn't send back a reply notification. However, since multiple client components can register to receive notifications from a channel component, there could be cases where several replies are sent back to the shared resource via the channel component.

In this scenario, when multiple client components register to receive notifications, the reply is received from the first client component who responds. In the case of an ongoing dialogue (e.g., notify, reply, notify, etc.), the spooler will close the other channels and the dialog will continue with the first client. In another scenario, a dialogue with multiple client components is supported. For example, the notification server or channel component can provide a way to synchronize the multiple dialogs/listeners.

For example, if two users, Joe and the Administrator, register to receive notifications based on Joe's user account filter, and a notification is received by both Joe, and the Administrator, the first reply notification received back will be forwarded to the printing component.

In this scenario, the notification type (e.g., a GUID) is used by the spooler to filter for listeners. Additionally, a-printing component and/or a client component use the notification to type identify the data schema of the notification object.

In this scenario, a client component (e.g., a printing component) registers with a notification server (e.g., a spooler). When the client registers for notifications, the server side listener component will keep an internal table with information about the client component such as the listener properties. As shown in Table 3, an opaque registration handle pointer is returned to the client component in response to the registration request. The client component uses the registration handle to unregister for notifications.

TABLE 3

Registration Handle

```
    typedef struct _HNOTIFY
    {
        // opaque
    } * HNOTIFY;
```

In this scenario, as shown in Table 4, the notification data will be handled as an object exposing the INotifyDataObject interface. The client components and shared resource components of the notification server can define a data schema and send and receive data in the defined schema. For example, the clients of the spooler can define their own data schemas and assign GUIDs to the various types to signal which one(s) to implement for a given notification system and they can send any data type back and forth. Although the schema is not necessarily known by the notification server, the size may be required for transport, and the notification type (e.g., GUID) may be part of listener or sender properties. For example, the spooler asks the notification data object for a BYTE* pointer, the length of the data, and the notification type. The notification type is a GUID pointer.

TABLE 4

Data Notification Interface

```
    interface INotifyDataObject : IUnknown
    {
        typedef GUID* NotificationType;
        HRESULT AquireData(
            [out]BYTE**,
            [in, out]ULONG*,
            [in, out]NotificationType*
        );
        HRESULT ReleaseData(
            VOID
        );
    };
```

In this scenario, the printing component packs the data in an INotifyDataObject, and the listening client calls AquireData data to get a raw pointer to the notification data, the size of notification data, and the notification type. When the listening client is done using the data, the listening client calls ReleaseData. Preferably, clients implementing the INotifyDataObject call ReleaseData( ) before calling Release( ) on the listener component. In this scenario, the AquireData call will increment the object's reference count and ReleaseData decrements the object's reference count.

In this scenario, as shown in Table 5, some objects expose an ICallback interface.

TABLE 5

ICallBack Interface

```
    interface ICallback : IUnknown {
        HRESULT OnEventNotify(
            [in] IAsynchNotification
                *pIAsyncNotification,
            [in] INotifyDataObject
                *pNotification
        );
        HRESULT ChannelClosed(
            [in] IAsynchNotification
                *pIAsyncNotification,
            [in] INotifyDataObject
                *pNotification
        );
    };
```

An object exposing the ICallBack interface is provided by both the printing components and listening applications. Components interested in receiving notifications expose the ICallBack interface. Thus, listening clients provide a pointer to an ICallback interface at registration time. This pointer is used to send notifications. Further, the shared resource exposes a pointer to an ICallback interface in order to receive reply notifications.

When a notification is sent from a shared resource (e.g., a print component) to a client program, the service will call the OnEventNotify method at the client program end of the channel to deliver the notification. When a channel is closed at one end, the service will call the ChannelClosed method at the other end to announce that the channel is closed. The reason for closing the channel will be delivered as a notification. If the shared resource or notification server shuts down, the service will call ChannelClosed, delivering a Notification_Died type of message.

In this scenario, as shown in Table 6, a component exposing an IAsynchNotification interface is provided by the service at both the client program side and notification server side in response to opening a notification channel when the printing component calls the CreateNotificationChannel.

TABLE 6

IAsynchNotification Interface

```
interface IAsynchNotification : IUnknown {
    // Sends notification of a certain type.
    HRESULT SendNotification(
        [in] INotifyDataObject *pNotification
        // Notification data.
    );
    // Closes the notification channel.
    HRESULT CloseChannel(
        [in] INotifyDataObject *pNotification
        // Reason for closing
    );
    // Query notif. type that channel supports.
    HRESULT GetChannelNotificationType(
        [out] INotifyDataObject
            **pNotificationType
        //Notification Channel type
    );
};
```

The IAsynchNotification interface identifies a channel and it can be used to send notifications or close the channel. A sender calls SendNotification to send a notification. The role of the sender can be played by either the printing component that opens the channel and sends notifications or by the listening client when it wishes to send back a reply notification. To close the channel, either the sender or listener can call CloseChannel. They can pass in a notification holding the reason for closing the channel, or just a NULL pointer. If the channel creator associates a notification type with a channel, GetChannelNotificationType will return the channel notification type as a INotifyDataObject with NULL data.

In this scenario, the CreatePrintNotificationChannel is called by the printing components to create a notification channel. The channel can be per printer handle or a per server handle. The printing components can open channels which are loaded by the spooler. For example, a driver (e.g., Winspool.drv) will expose this functionality if loaded in the spooler, thereby allowing print drivers to open channels. Further, in this scenario, a spooler library (e.g., Spoolss.lib) exposes this functionality so that port monitors and other print components can open channels. Thus, components hosted by the spooler server, which includes a link to the spooler library, can call CreatePrintNotificationChannel.

In this scenario, as shown in Table 7, the CreatePrintNotificationChannel call includes certain inputs and outputs.

TABLE 7

CreatePrintNotificationChannel

```
HRESULT CreatePrintNotificationChannel (
    [in] PCWSTR PrinterName,
    [in] NotificationType ChannelType,
    [in] ESessionFilter eSessionFilter,
    [in] ECommunication eCommunication,
    [in] ICallback* pCallback,
    [out]IAsynchNotification**pIAsyncNotification
);
```

As shown in Table 7, the channel will be associated with the session that opened the print handle (e.g., a printer name). A session filter specifies the sessions that will receive the notifications (e.g., eSessionFilter). A channel notification type specifies the type of notifications that are supported. A communication filter specifies whether the channel is uni/bidirectional. The ICallback interface specifies where to call when a notification comes back from the other end of the channel. This can be NULL if the caller is not interested in responses.

The method returns an IAsyncNotification object that will identify the channel and that will be used to send notifications and close the channel. For example, to close the channel, one can call CloseChannel method of the IAsynchNotification interface.

In this scenario, as shown in Table 8, the RegisterForPrintNotifications call includes certain inputs and outputs.

TABLE 8

RegisterForPrintNotifications

```
HRESULT RegisterForPrintNotifications(
    [in] PCWSTR PrinterName,
    [in] NotificationType NotifyType,
    [in] ESessionFilter  eSessionFilter,
    [in] ECommunication  eCommunication,
    [in] ICallback*  pCallback,
    [out] HNOTIFY*       phNotify
);
HRESULT UnRegisterForPrintNotifications (
    [in] HNOTIFY hNotify
);
```

The RegisterForPrintNotifications method is called by listening clients to register for receiving notifications. The listening client can live inside the spooler or in any application. The driver (e.g., Winspool.drv) will expose this functionality regardless where is it loaded. The spooler library (e.g., Spoolss.lib) will expose this functionality so that port monitors can register for notifications. Components hosted by the spooler which link with the spooler library (e.g., Spoolss.lib) can call RegisterForPrintNotifications. As shown, the local/remote printer or server name is specified (e.g., a print handle). A notifications type indicates the type of notifications to send to the listener. A session filter indicates what session notifications to send to the listener. A communication filter specifies whether the listener is interested in bi/unidirectional communications. An ICallback interface specifies where to send notifications. The method returns an opaque registration handle that the client uses to unregister by calling UnRegisterForPrintNotifications. This registration will be associated with the Session ID of the thread making the registration call. In this scenario, the spooler will filter the listening clients based on the channel's session filter and client's registration session plus the client session's filter.

EXAMPLE 28

Exemplary Registration and Notification Server Method

Figure 19:
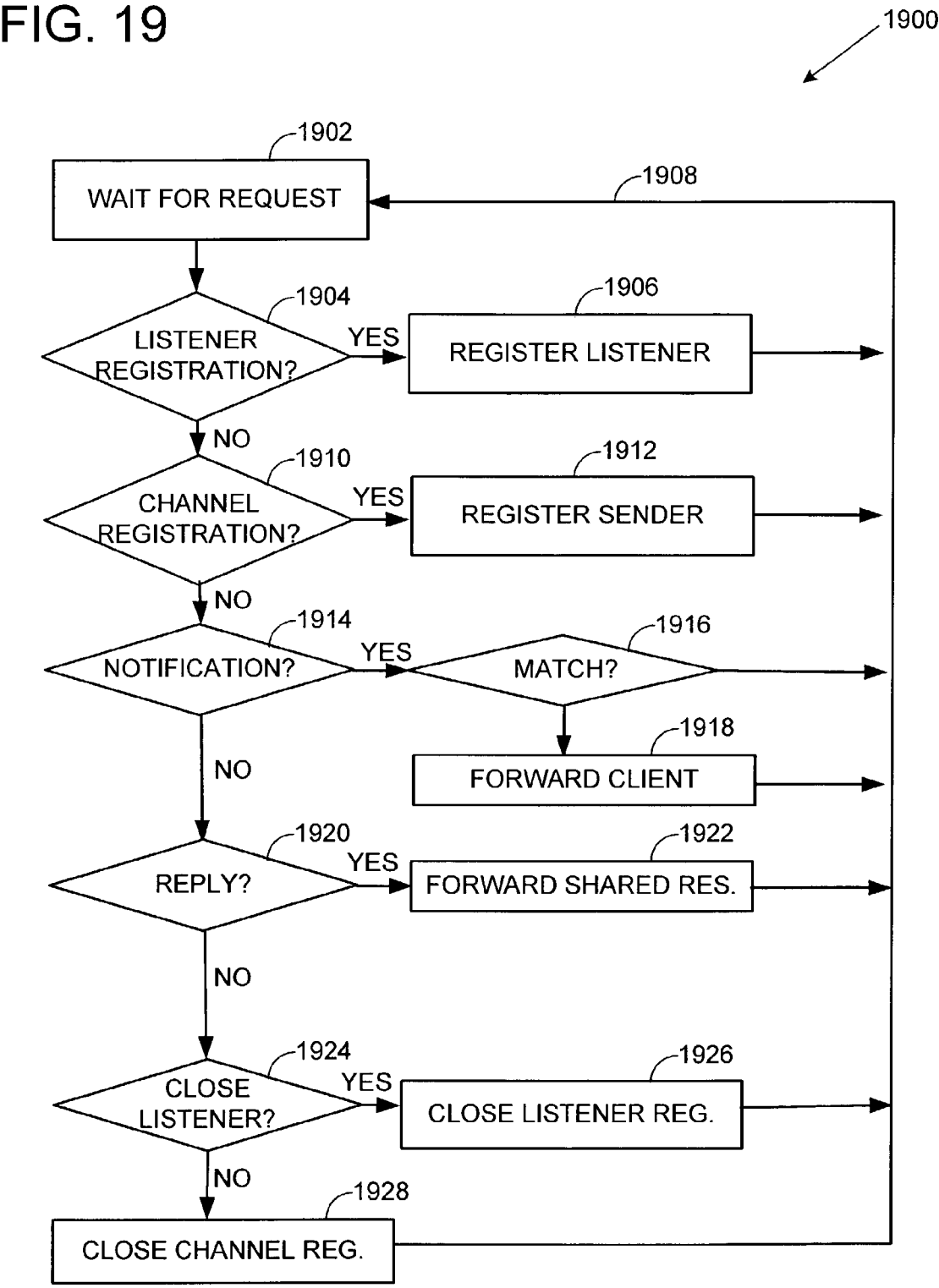
FIG. 19 is a flowchart of a notification method for registering clients and shared resources, and for forwarding notifications and replies according to registered properties.

FIG. 19 shows an exemplary method 1900 for accomplishing sending notifications and receiving reply notifications according to a notification server method. At 1902, the method is waiting for requests from any of a plurality of clients. To avoid waiting, the notification server or exemplary method 1900 can be instantiated by the runtime environment upon a request. In practice, the waiting need not be an affirmative action (e.g., the server need not execute a wait instruction). The described requests can be method calls under an object model (e.g., COM, DCOM, JAVA, C++, etc.).

At 1904, a request to register listener properties for receiving notifications is received from a client component. The listener properties for (e.g., contained in or determined from) the request are associated with the client component sending the request (e.g., via listener registration) at 1906. In one scenario, the described associations are contained in a data structure that holds the received properties along with an identifier of the source of the request. The method then returns 1908 to wait for a next request 1902. The listener properties indicate at least one of the exemplary properties described herein. If the request is not a listener registration request, the method continues at 1910.

At 1910, a request to register channel properties is received from a shared resource. The sender properties for (e.g., contained in or determined from) the request are associated with the shared resource sending the request (i.e., sender registration) at 1912. In one scenario, the association is contained in a data structure that holds the received properties and a shared resource identifier. The method then returns 1908 to wait for a next request 1902. The sender properties indicate at least one of the exemplary properties described herein. If the request is not a sender registration request, the method continues at 1914.

At 1914, a notification (e.g., a notification object) is received from the shared resource. When the request is a notification, at 1916 the method compares the sender properties registered by the shared resource sending the notification with registered listener properties. If the comparison is affirmative 1916, the notification is forwarded to the client component 1918 with the listener properties causing the affirmative comparison. In one scenario, the client component registers for notifications created by a print driver component while running in the client component's security context. In another scenario, the client component registers for notifications created by a print monitor component running in a certain terminal session. In another scenario, the client component registers for all spooler notifications of a certain notification type. Upon a affirmative comparisons 1916, the notification is forwarded to the client component(s) 1918 with corresponding affirmative listener properties. If there are no affirmative comparisons 1918, the method returns 1908 to wait 1902 for a next request. However, if the request is not a notification request 1914, the method continues at 1920.

At 1920, if the request is a request from a client component to send a reply notification, the reply notification is returned to the shared resource 1922 that sent the notification from which the reply is responding, and then the method returns 1908 to wait for the next method. If the request is not a reply request, then the method continues at 1924.

At 1924, if the request is a request from a client component to close the association between the client component and the listener properties, the association is closed 1926, and the method returns 1908 to wait for a next request 1902.

At 1928, if the request is a request from a shared resource to close the association between the shared resource and the sender properties, the association is closed 1928, and the method returns 1908 to wait for a next request 1902.

This method 1900, like any of the other methods described herein are possibly distributed and functioning across several process spaces. In such a case, actions of the method may be performed in multiple process spaces. For example, a notification is typically received in the notification server space, whereas the reply notification is typically received in a client component space. Other actions may have code executed in both address spaces. For example, a listener registration request can be received in the client component address space and partially completed in the notification server space-assuming inter-process communication.

In practice, the comparison actions (e.g., 1904, 1910, etc.) may not be carried out affirmatively. Instead, the various functions can be accessed by calling the appropriate executable method (e.g., a member function of an appropriate interface).

EXAMPLE 29

Exemplary Client Registration and Notification Method

Figure 20:
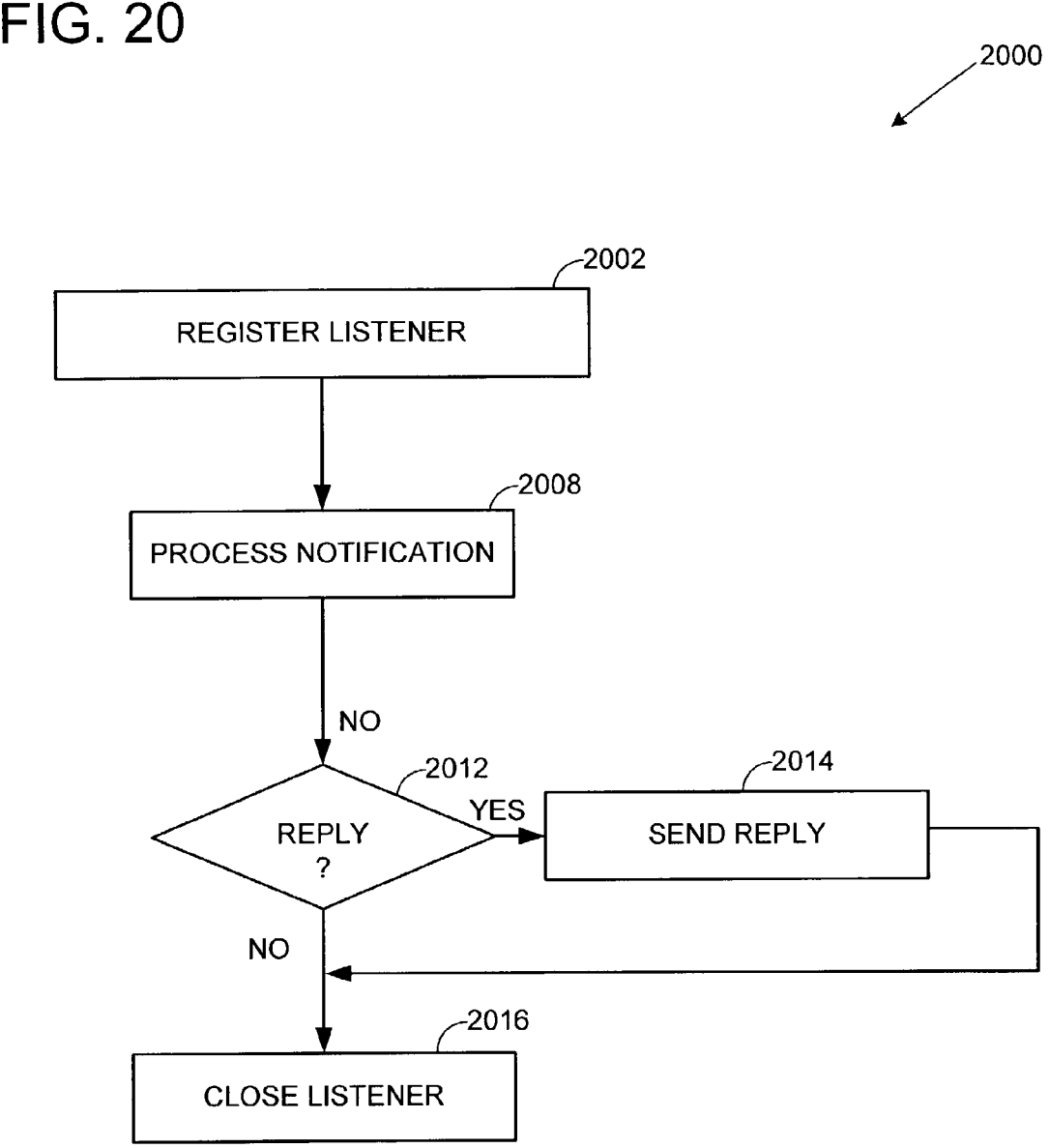
FIG. 20 is a flow chart of a client method for registering clients to receive notifications and send replies.

FIG. 20 shows an exemplary method 2000 implemented by a client program to process notifications in concert with a notification server. In one scenario, the client program is a session running in a terminal server. In another scenario, the client program is executing in one of plural user states that users can switch between without logging off in a single computer environment. A client program is typically one of plural client programs requesting services from a shared resource and registering with a notification server to receive notifications originating from the shared resource and initially delivered to the notification server.

At 2002, a client program registers as a listener with a notification server (e.g., via listener registration). Listener properties for the registration can be contained in or determined from the request. The client then optionally continues processing other tasks, until such time as a notification matching the registered properties is received from the notification server. For example, in one scenario, a client program is a terminal session executing an application (e.g., word processing, spreadsheet processing, etc.) for a user logged in at a remote terminal. After requesting print services, the session may go on to process further editing requests generated by the user at the remote terminal. Thus, the terminal session goes on processing after requesting printing services.

Upon receiving a notification, the client program processes (e.g., generates a user interface presentation for) the notification at 2008. The client can then go on with other processing. In one scenario, the notification was sent by the notification server in response to determining that the notification matched the listener properties. For example, in one scenario, the client program is a terminal session, and the notification is a state change about a printing component. In one scenario, the client is a terminal session, and control logical for displaying the notification at a remote terminal station is generated and sent to the remote terminal. In another scenario, the user interface is identified by the client program with a notification type identifier (e.g., Globally Unique IDentifier) located in the listener properties, or located in the notification object itself. In one scenario, when the client is a terminal session running on a terminal services server, the generated user interface is presented at a remote terminal.

At 2012, the client decides to send a reply notification to the notification server at 2014. The reply is forwarded to the shared resource. For example, in printing scenarios, such a reply may indicate that a job is to be canceled or re-routed. The client can then return to other processing and may receive other notifications.

If desired, the registered client may maintain a registration to receive multiple notifications. Replies can be sent for some, but not others.

At 2016, because the client is no longer interested in receiving additional notifications (e.g., the client is terminating), the registered listener is closed.

The various functions shown can be accessed by calling an appropriate executable method (e.g., a member function of an appropriate interface).

EXAMPLE 30

Exemplary Shared Resource Registration and Notification Method

Figure 21:
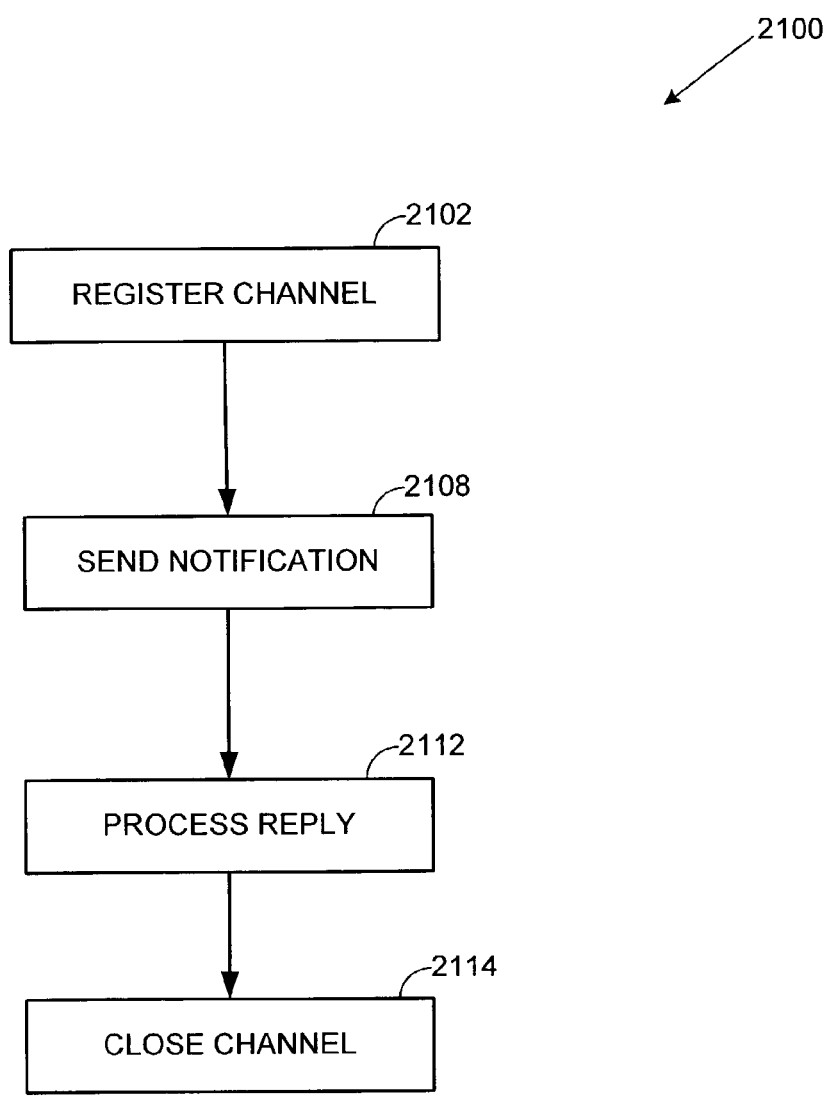
FIG. 21 is a flow chart of a shared resource method for registering channels to send notifications and process replies.

FIG. 21 shows an exemplary method 2100 executed by a shared resource for sending notifications. In one scenario, the shared resource is a print component running in a print spooler. In another scenario, the spooler is a notification server hosting a print component shared resource. In another scenario, the shared resource is a print driver running on a computer shared by several users, and the users can switch between users states without logging on/off each time. The notifications are typically routed to one of plural clients requesting services from a shared resource and registering for notifications from a notification server.

At 2102, sender properties are registered with the notification server. The sender properties can be in the request to register or determined from the request to register and indicate at least one of the exemplary sender properties described herein. The shared resource can then continue with other processing.

At some point (e.g., upon receiving indication that a printer is out of paper), a notification is sent to the notification server at 2108. The shared resource can then continue with other processing.

Upon receiving a reply (if any), the reply can be processed at 2112. In some cases, replies are not expected, and no reply processing need be performed. The shared resource can then continue on with other processing.

At 2114, the channel is closed (e.g., the registration is closed). The channel need not be closed if further notifications are to be processed.

EXAMPLE 31

Exemplary Application of Technologies to Printer Scenarios

Any of the technologies described herein can be applied to printing scenarios. In such scenarios, it is often helpful for the printer to provide notifications back to a user indicating a state of the printer. Such notifications can be achieved via the technologies described herein. For example, a printing component can send a notification.

Such notifications can indicate a condition of the printer (e.g., state of the printer, error message, and the like). For example, an out-of-paper or manual paper feed message can be sent via a notification. Any number of other printing-related messages can be sent.

If bi-directional communication is implemented, a user can then send a notification back to indicate action to be taken (e.g., cancel or reschedule the print job).

EXAMPLE 32

Exemplary Printing Shared Resource System

Figure 22:
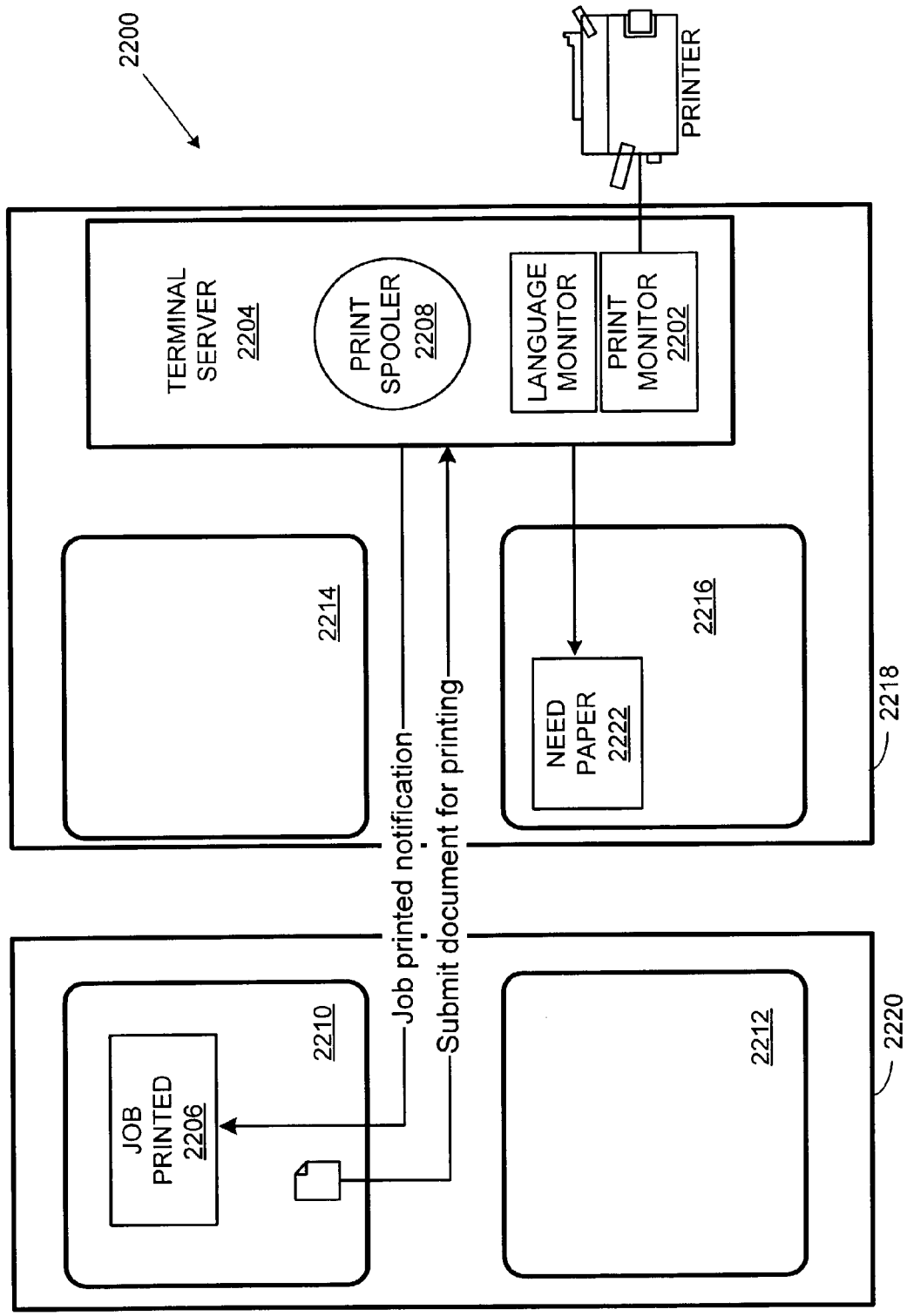
FIG. 22 is an exemplary system including clients registering for notifications and requesting shared resources from a printing resource.

FIG. 22 is an exemplary system 2200 having two machines: a print server 2218 and another machine 2220, each displaying terminal session user interfaces. The print server 2218 includes a printing resource 2202 running for terminal session software 2204, and sending notifications to a registered client application 2210 on the other computer 2220. In this example, the notification system is used by a print spooler 2208 to send notifications to listening applications when a submitted job is printed. In this scenario, three printing applications 2210, 2212, 2214 run impersonating a domain guest user, and another session 2216 monitors printing device status notifications.

The applications 2210, 2212, 2214 running as guest users are registered to receive a notification when the device completes printing. Each of the applications 2210, 2212, 2214 are associated with a different session. The system services (e.g., the printing resource 2202 and the spooler 2208) are associated with the console session.

In the example, even if the applications run impersonating the same user, the notification is sent only to the application that sent the document. In this case, a session filter is used to send the notification to the registered session 2210 that submitted the job. Also, an "Out-Of-Paper" notification 2222 is sent only to the registered applications interested in device status notifications.

EXAMPLE 33

Exemplary Implementation in Terminal Server Environment

Components provided by independent hardware vendors and independent software vendors can use the technologies described herein to show user interface in the terminal server session associated with a client component requesting printing or other shared resource services. In this way, the user interface can appear at the location (e.g., remote session) from which the request originated, rather than the console session.

For example, a printer manufacturer or printer driver developer can include functionality in a print driver that generates appropriate notifications and engages in a two-way dialog with the user. In a terminal server or fast user switch environment, the user interface for the message can be shown in the appropriate session or for the appropriate user as desired.

EXAMPLE 34

Exemplary Use of Replies

The reply notification mechanism can be used in combination with any of the examples described herein to communicate user actions back to the shared resource. For example, upon receiving a notification, a client can send a user interface presentation of the notification on the display. The user interface presentation can include an interactive user interface element (e.g., a pushbutton). Upon activation of the user interface element, a reply notification can be sent back to the shared resource.

For example, in a printing scenario, a user may indicate that a print job is to be canceled, retried, or re-routed. In the case of re-routing the print job, a different destination can be communicated by including the destination in the reply notification.

Such scenarios can be supported in a terminal server environment. In such a case, the user interface presentation may be presented at a remote display located at a remote terminal.

EXAMPLE 35

Computing Environment

Figure 23:
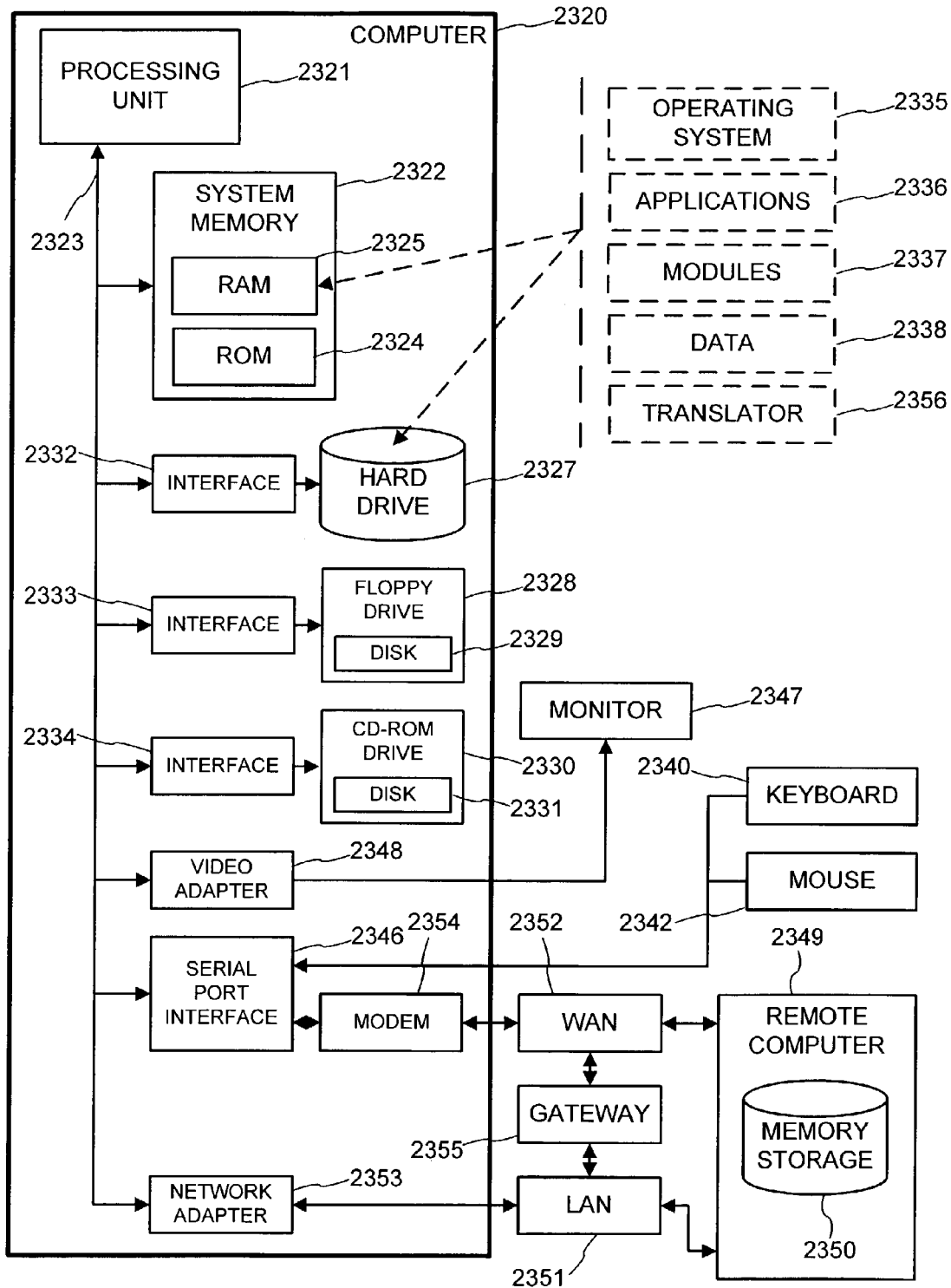
FIG. 23 is a block diagram of a distributed computer system that may be used to implement methods and apparatus embodying the described notification technologies.

FIG. 23 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 23, an exemplary system for implementation includes a conventional computer 2320 (such as personal computers, laptops, servers, mainframes, and other variety computers) includes a processing unit 2321, a system memory 2322, and a system bus 2323 that couples various system components including the system memory to the processing unit 2321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 2321.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 2324 and random access memory (RAM) 2325. A basic input/output system (BIOS), containing the basic routines that help to transfer information between elements within the computer 2320, such as during start-up, is stored in ROM 2324.

The computer 2320 further includes a hard disk drive 2327, a magnetic disk drive 2328, e.g., to read from or write to a removable disk 2329, and an optical disk drive 2330, e.g., for reading a CD-ROM disk 2331 or to read from or write to other optical media. The hard disk drive 2327, magnetic disk drive 2328, and optical disk drive 2330 are connected to the system bus 2323 by a hard disk drive interface 2332, a magnetic disk drive interface 2333, and an optical drive interface 2334, respectively. The drives and their associated computer-readable media provide nonvolatile storage of data, data structures, computer-executable instructions, etc. for the computer 2320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 2325, including an operating system 2335, one or more application programs 2336, other program modules 2337, and program data 2338; in addition to an implementation 2356.

A user may enter commands and information into the computer 2320 through a keyboard 2340 and pointing device, such as a mouse 2342. These and other input devices are often connected to the processing unit 2321 through a serial port interface 2346 that is coupled to the system bus, but may be connected by other interfaces, such as a parallel port, game port or a universal serial bus (USB). A monitor 2347 or other type of display device is also connected to the system bus 2323 via an interface, such as a video adapter 2348. In addition to the monitor, computers typically include other peripheral output devices (not shown), such as speakers and printers.

The computer 2320 operates in a networked environment using logical connections to one or more remote computers, such as a remote computer 2349. The remote computer 2349 may be a server, a router, a peer device or other common network node, and typically includes many or all of the elements described relative to the computer 2320, although only a memory storage device 2350 has been illustrated. The logical connections depicted include a local area network (LAN) 2351 and a wide area network (WAN) 2352. Such networking environments are commonplace in offices, enterprise-wide computer networks, intranets and the Internet.

When used in a LAN networking environment, the computer 2320 is connected to the local network 2351 through a network interface or adapter 2353. When used in a WAN networking environment, the computer 2320 typically includes a modem 2354 or other means for establishing communications (e.g., via the LAN 2351 and a gateway or proxy server 2355) over the wide area network 2352, such as the Internet. The modem 2354, which may be internal or external, is connected to the system bus 2323 via the serial port interface 2346. In a networked environment, program modules depicted relative to the computer 2320, or portions thereof, may be stored in the remote memory storage device. It will be appreciated that the network connections shown are exemplary and other means of establishing a communications link between the computers may be used.

Alternatives

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Techniques from one example can be incorporated into any of the other examples. Some of the examples describe "forwarding" a notification. Such examples can comprise sending at least an indication of the notification, forwarding (e.g., relaying) the notification itself, or some combination thereof.

In view of the many possible embodiments to which the principles of our invention may be applied, it should be recognized that the detailed embodiments are illustrative only and should not be taken as limiting the scope of our invention.

Rather, we claim as our invention all such embodiments as may come within the scope and spirit of the following claims and equivalents thereto.

We claim:

1. A method comprising:
   receiving at a server a request from a client for registering the client to receive notifications generated by a printer shared by a plurality of clients, the request including an indication of whether bi-directional communication or unidirectional communication should be used for communicating notifications between the printer and the client and the request further including an identity context property for the client, wherein the identity context property comprises a security identifier used to determine whether the client can be registered;
   receiving at the server a notification generated by the printer, wherein the notification indicates a state condition of the printer and is associated with one or more sender properties of the printer, the sender properties comprising an identity context property; and
   sending by the server at least an indication of the notification to the client based on a comparison between at least the identity context property of the sender properties and the identity context property for the client, wherein the indication of the notification comprises data for a user interface presentation indicting the state condition for the printer.

2. The method of claim 1 wherein:
   the printer is shared by multiple sessions in a terminal server environment;
   the client is responsible for invocation of the printer; and
   the identity context property of the sender properties indicates a session identifier for the client responsible for invocation of the printer.

3. The method of claim 1 wherein:
   the printer is shared by multiple users in a fast user switch environment; and
   the identity context property of a sender indicates which of the multiple users is accessing the printer.

4. The method of claim 1 wherein the identity context property comprises a user identifier.

5. The method of claim 1 wherein the identity context property comprises a security context identifier.

6. The method of claim 5 wherein the identity context property comprises a session identifier.

7. The method of claim 1 wherein the sender properties further comprise at least one of a communication type, a notification type, and a machine identifier.

8. The method of claim 1 wherein the identity context property comprises a session identifier and a security context identifier.

9. The method of claim 8 further comprising:
   determining the session identifier from information obtained during an inter-process call set-up from the client.

10. The method of claim 9 wherein the printer is associated with a different session than that of the client, but the sender properties indicate the session identifier determined from the inter-process call set-up.

11. The method of claim 1, wherein the user interface presentation comprises an interactive user interface element, the method further comprising:
    upon receiving an indication that the interactive user interface element has been activated, sending a reply notification to the printer.

12. The method of claim 1, wherein the state condition relates to an out of paper message.

13. The method of claim 1 wherein the state condition comprises an error condition.

14. The method of claim 1, wherein the state condition comprises a state of a printer's paper resources.

15. The method of claim 1 wherein the notification comprises data indicating printing specific data for the printer.

16. The method of claim 1 further comprising:
    upon receiving the notification by the client, generating a user interface presentation of the notification.

17. The method of claim 1 further comprising:
    upon receiving the notification by the client, generating a user interface presentation of the notification, wherein the user interface presentation comprises an interactive user interface element; and
    upon receiving an indication that the user has selected the interactive user interface element, sending a reply notification to the printer.

18. The method of claim 1 further comprising:
    obtaining one or more listener properties for the client, wherein the listener properties comprise the identity context property for the client; and
    associating the client with the listener properties.

19. The method of claim 18 wherein the identity context property for the client is obtained from information contained in a Remote Procedure Call from the client.

20. The method of claim 18 further comprising: obtaining the one or more sender properties for the printer; and associating the printer with the sender properties.

21. The method of claim 18 further comprising: receiving a reply notification from the client; and forwarding the reply notification to the printer.

22. The method of claim 18 wherein the listener properties further comprise at least one of a communication type, a notification type, a session identifier and a machine identifier.

23. The method of claim 18 wherein the listener properties further comprise at least one of a communication type, a notification type, and a machine identifier.

24. The method of claim 18 wherein the listener properties are received before the sender properties.

25. The method of claim 18 wherein the sender properties are received before the listeners properties.

26. The method of claim 18 further comprising:
    receiving from a second client, second listener properties comprising an identity context property;
    associating the second client with the second listener properties; and
    forwarding the notification to the second client based on a comparison of second listener properties and sender properties.

27. The method of claim 18 further comprising:
    upon receiving the notification, sending a user interface presentation of the notification to a display located on a remote terminal.

28. The method of claim 18 wherein:
    the listener properties are specified by a client having administrative rights; and
    the listener properties indicate notifications for a user other than that associated with the client are to be received.

29. The method of claim 18 wherein:
    the listener properties are specified by a client having administrative rights; and the listener properties indicate notifications of a particular notification type for any user are to be forwarded to the client component.

30. The method of claim 18 wherein:
    the notification indicates that the printer is out of paper; and
    the listener properties indicate a session identifier and a security context of the client requesting a print job.

31. The method of claim 18 wherein:
listener properties are received from the plurality of clients, each of the plurality of clients associated with respective listener properties; and
the sending further comprising:
comparing the identity context property of the sender properties with each of the respective listener properties received from each of the plurality of clients; and
based on the comparing, forwarding the notification to a subset of the plurality of clients including the client.

32. The method of claim 31 wherein
the plurality of clients are associated with terminal sessions executing on a terminal server; and
the subset is a single client executing in a particular session.

33. Computer storage media storing computer executable instructions that when executed perform a method comprising:
receiving at a server a request from a client for registering the client to receive notifications generated by a printer shared by a plurality of clients, the request including an indication of whether bi-directional communication or unidirectional communication should be used a for communicating notifications between the printer and the client and the request further including an identity context property for the client, wherein the identity context property comprises a security identifier used to determine whether the client can be registered;
receiving at the server a notification generated by the printer, wherein the notification indicates a state condition of the printer and is associated with one or more sender properties of the printer, the sender properties comprising an identity context property; and
sending by the server at least an indication of the notification to the client based on a comparison between at least the identity context property of the sender properties and an identity context property for the client wherein the indication of the notification comprises data for a user interface presentation indicting the state condition for the printer.

34. The computer storage media of claim 33 wherein the identity context property comprises a user identifier.

35. The computer storage media of claim 33 wherein the identity context property comprises a security context identifier.

36. The computer storage media of claim 33 wherein the identity context property comprises a session identifier.

37. The computer storage media of claim 33 wherein the sender properties further comprise at least one of a communication type, a notification type, and a machine identifier.

38. The computer storage media of claim 33 wherein the identity context property comprises a session identifier and a security context identifier.

39. A system for receiving notifications from a printer, the system comprising:
a client that:
sends a request for registering the client to receive notifications generated by a printer shared by a plurality of clients, the request including an indication of whether bi-directional communication or unidirectional communication should be used for communicating notifications between the printer and the client and the request further including an identity context property for the client, wherein the identity context property comprises a security identifier used to determine whether the client can be registered; and
receives notifications generated by a printer, wherein the notifications indicate a state condition of the printer;
upon receiving a notification, automatically displays a user interface presentation of the state condition of the printer; and
a server connected to the client that;
receives the request from the client for registering the client to receive notifications;
receives a notification generated by the printer, wherein the notification is associated with one or more sender properties of the printer, the sender properties comprising an identity context property; and
sends at least an indication of the notification to the client based on a comparison between at least the identity context property of the sender properties and an identity context property for the client, wherein the indication of the notification comprises data for a user interface presentation indicting the state condition for the printer.

40. The system of claim 39 wherein the identity context property comprises a user identifier.

41. The system of claim 39 wherein the identity context property comprises a security context identifier.

42. The system of claim 39 wherein the identity context property comprises a session identifier.

43. The system of claim 39 wherein the sender properties further comprise at least one of a communication type, a notification type, and a machine identifier.

44. The system of claim 39 wherein the identity context property comprises a session identifier and a security context identifier.

* * * * *